United States Patent
Todd

(10) Patent No.: US 11,475,073 B2
(45) Date of Patent: Oct. 18, 2022

(54) SYSTEM AND METHOD FOR MANAGEMENT OF DATA FROM DEPLOYMENTS

(71) Applicant: EMC IP Holding Company LLC, Hopkinton, MA (US)

(72) Inventor: Stephen James Todd, North Conway, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 240 days.

(21) Appl. No.: 16/530,973

(22) Filed: Aug. 2, 2019

(65) Prior Publication Data
US 2021/0034670 A1 Feb. 4, 2021

(51) Int. Cl.
*G06F 16/00* (2019.01)
*G06F 16/906* (2019.01)
*G06F 16/901* (2019.01)
*G06F 16/908* (2019.01)

(52) U.S. Cl.
CPC .......... *G06F 16/906* (2019.01); *G06F 16/901* (2019.01); *G06F 16/908* (2019.01)

(58) Field of Classification Search
CPC ..... G06F 16/906; G06F 16/901; G06F 16/908
USPC ........................................................ 707/737
See application file for complete search history.

(56) References Cited

U.S. PATENT DOCUMENTS

| | | | |
|---|---|---|---|
| 8,474,032 B2 | 6/2013 | Fetik | |
| 8,959,070 B2 | 2/2015 | Elbaz | |
| 2005/0257045 A1 | 11/2005 | Bushman | |
| 2005/0277403 A1 | 12/2005 | Schmidt | |
| 2014/0039943 A1* | 2/2014 | Ghindici | G06Q 10/02 705/5 |
| 2015/0356494 A1* | 12/2015 | Kolesnikov | G06Q 10/063114 705/7.15 |
| 2015/0363109 A1 | 12/2015 | Frick | |
| 2017/0168730 A1 | 6/2017 | Chiu et al. | |
| 2019/0158594 A1 | 5/2019 | Shadmon et al. | |
| 2020/0120023 A1 | 4/2020 | Munson et al. | |
| 2020/0213416 A1 | 7/2020 | Carrier | |
| 2020/0244701 A1 | 7/2020 | Di Domenico et al. | |
| 2020/0274713 A1 | 8/2020 | Li | |
| 2021/0224093 A1 | 7/2021 | Fu et al. | |

\* cited by examiner

*Primary Examiner* — Vincent F Boccio
(74) *Attorney, Agent, or Firm* — Chamberlain, Hrdlicka, White, Williams & Aughtry

(57) ABSTRACT

A global data aggregator for managing deployments includes persistent storage and a global data manager. The persistent storage stores globally aggregated data and an algorithm repository. The global data manager obtains deployment aggregated data from a deployment of the deployments; makes a determination that a new type of data is included in the deployment aggregated data; and in response to the determination: performs an action set, based on the new type of the data, to modify a content of future deployment aggregated data obtained from the deployment.

20 Claims, 15 Drawing Sheets

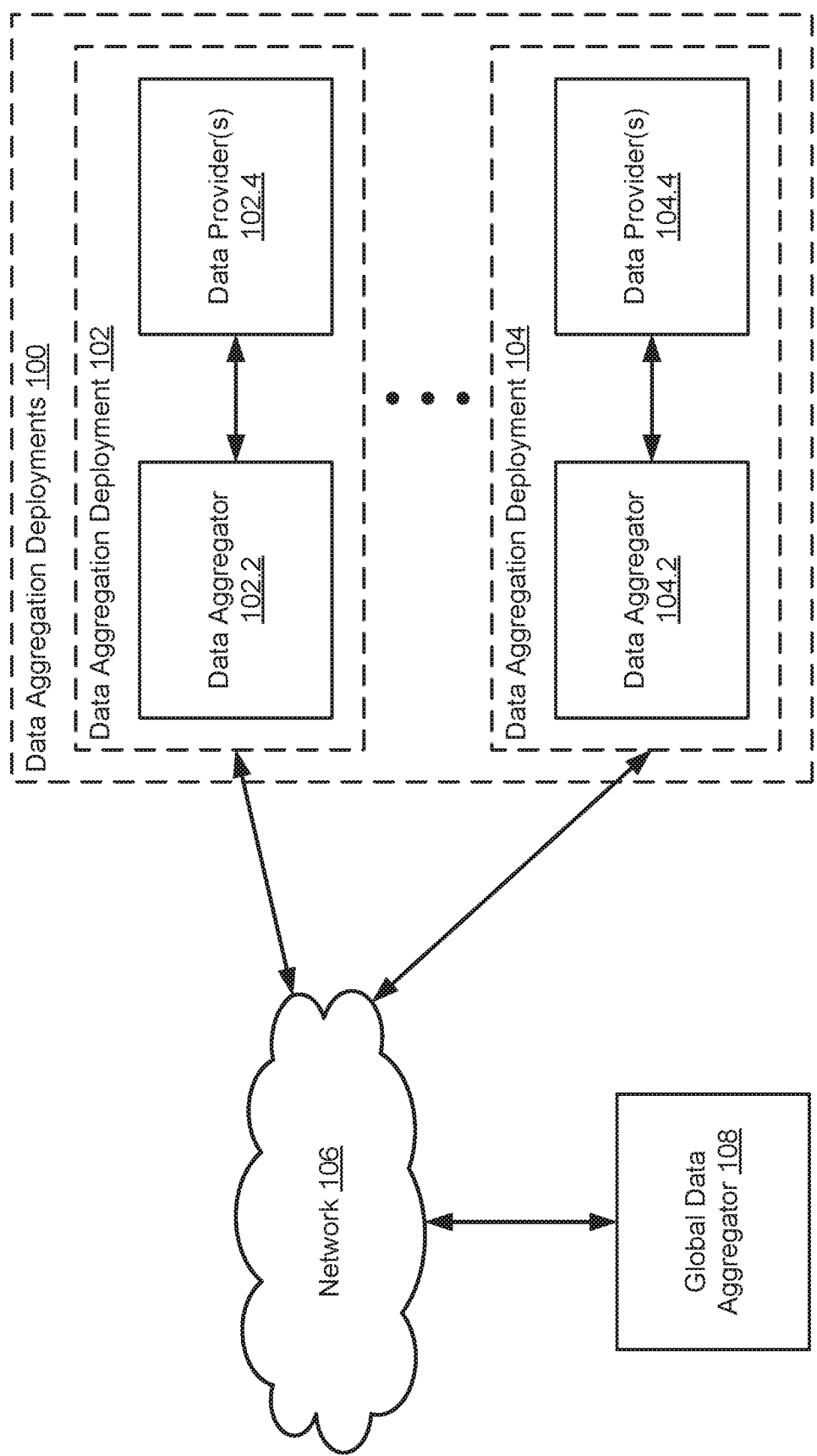
FIG. 1.1

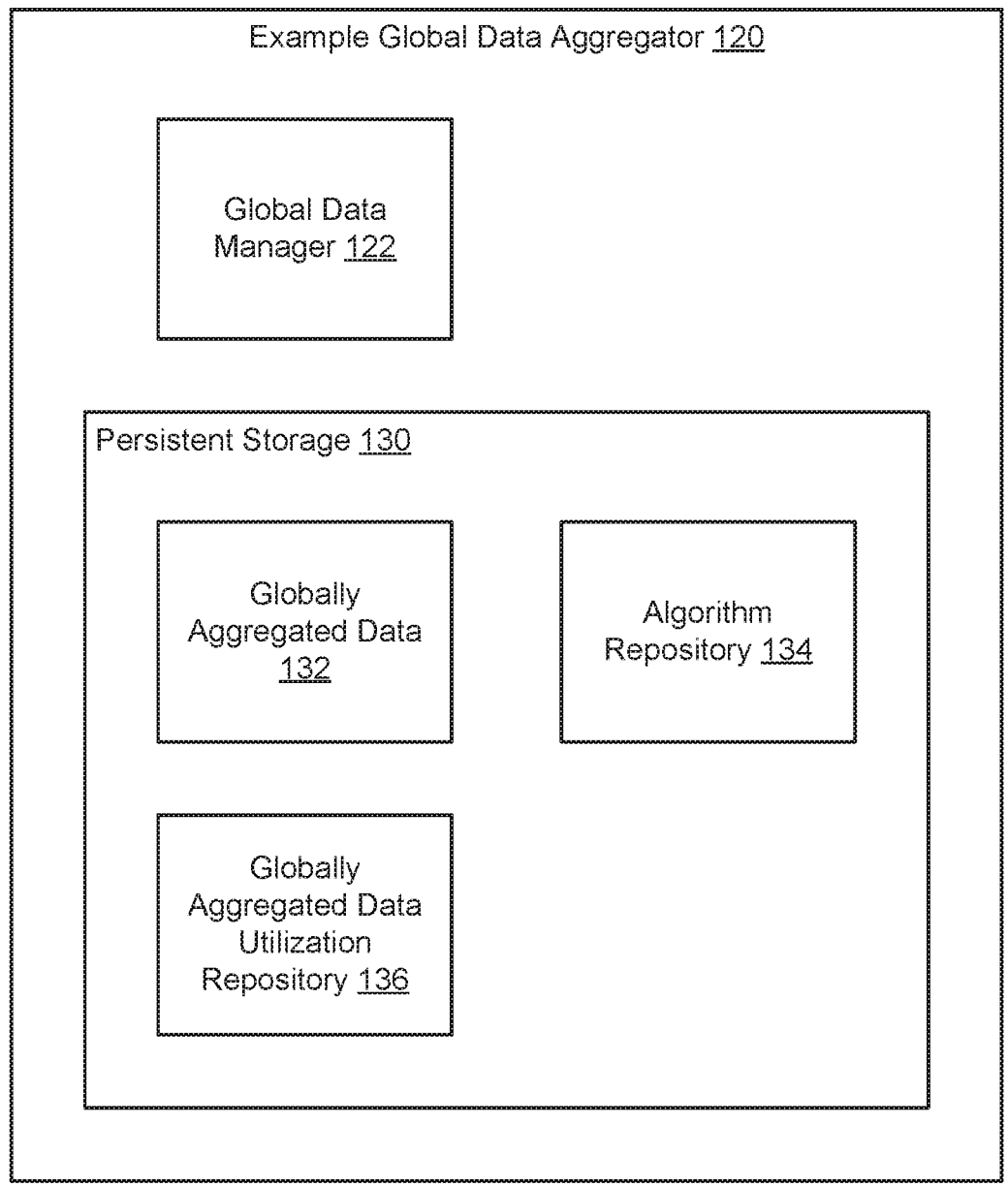
FIG. 1.2

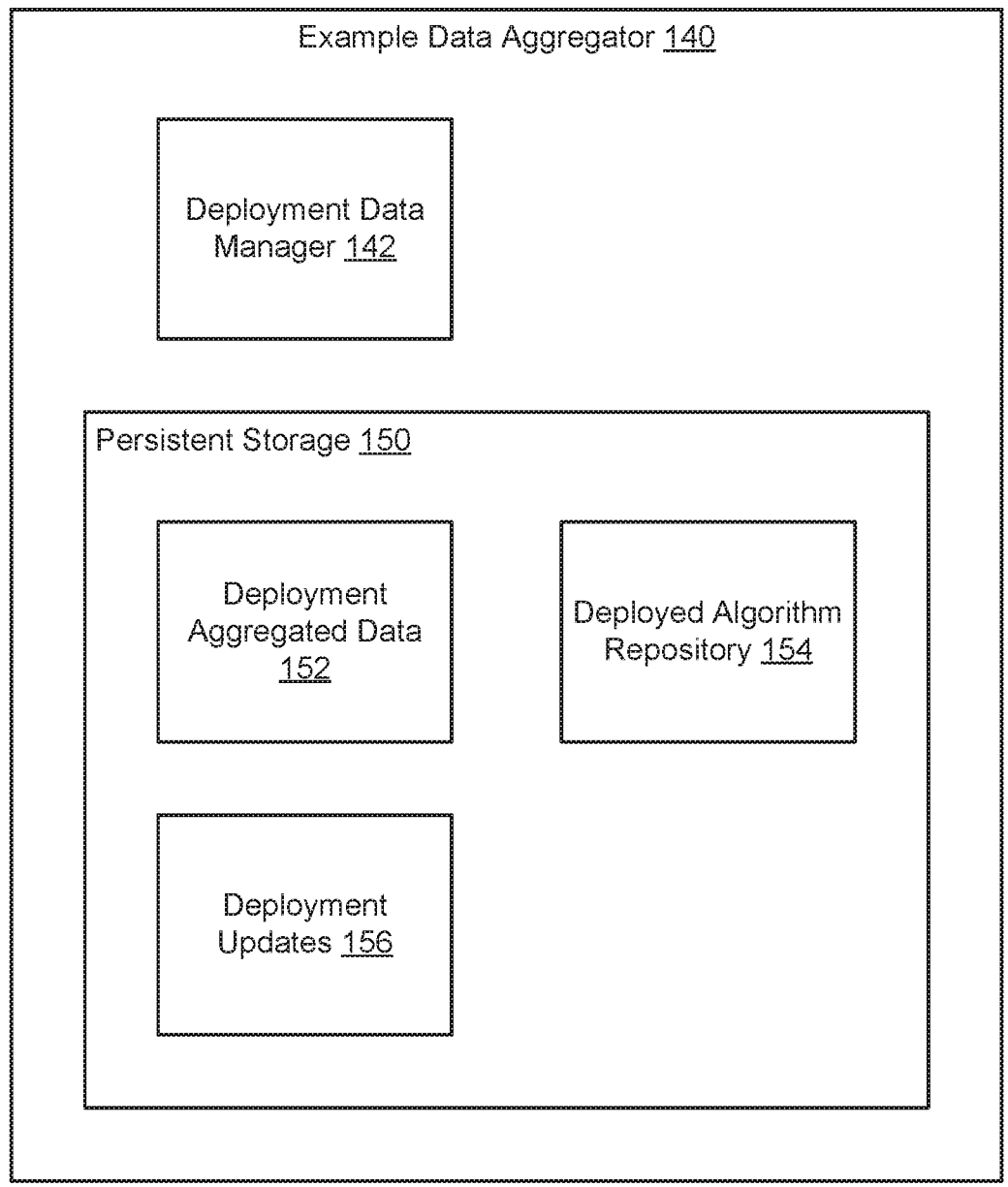
FIG. 1.3

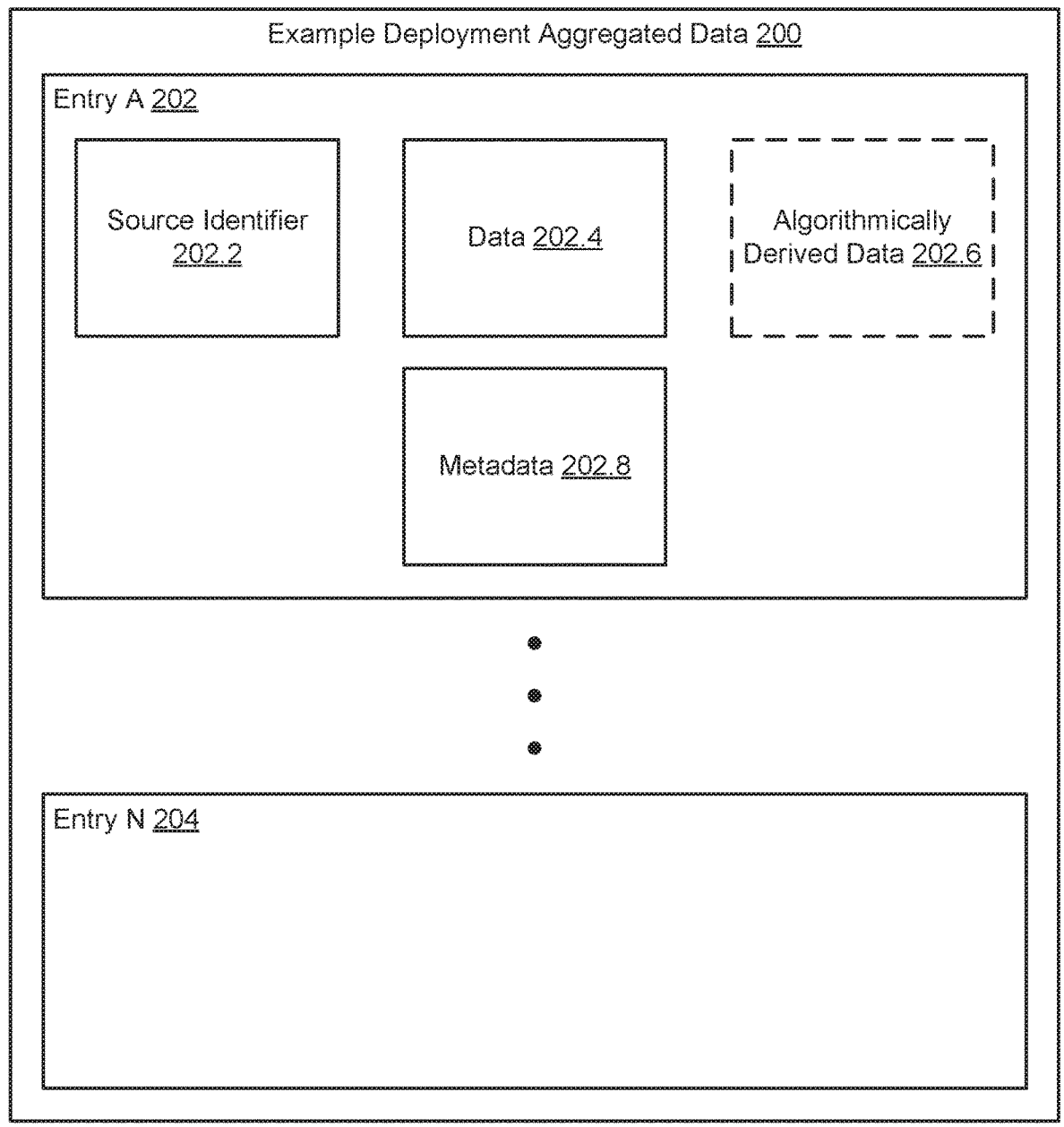
FIG. 2.1

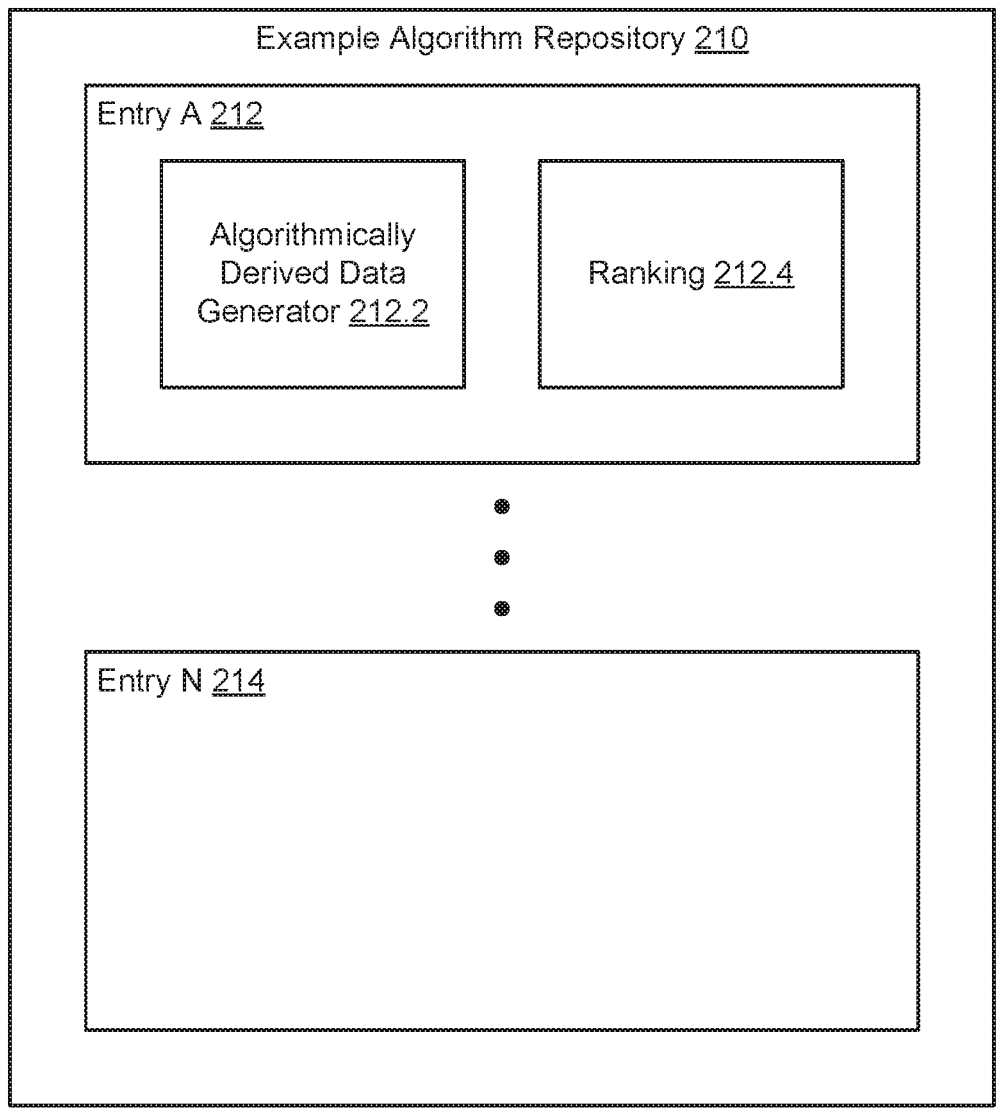
FIG. 2.2

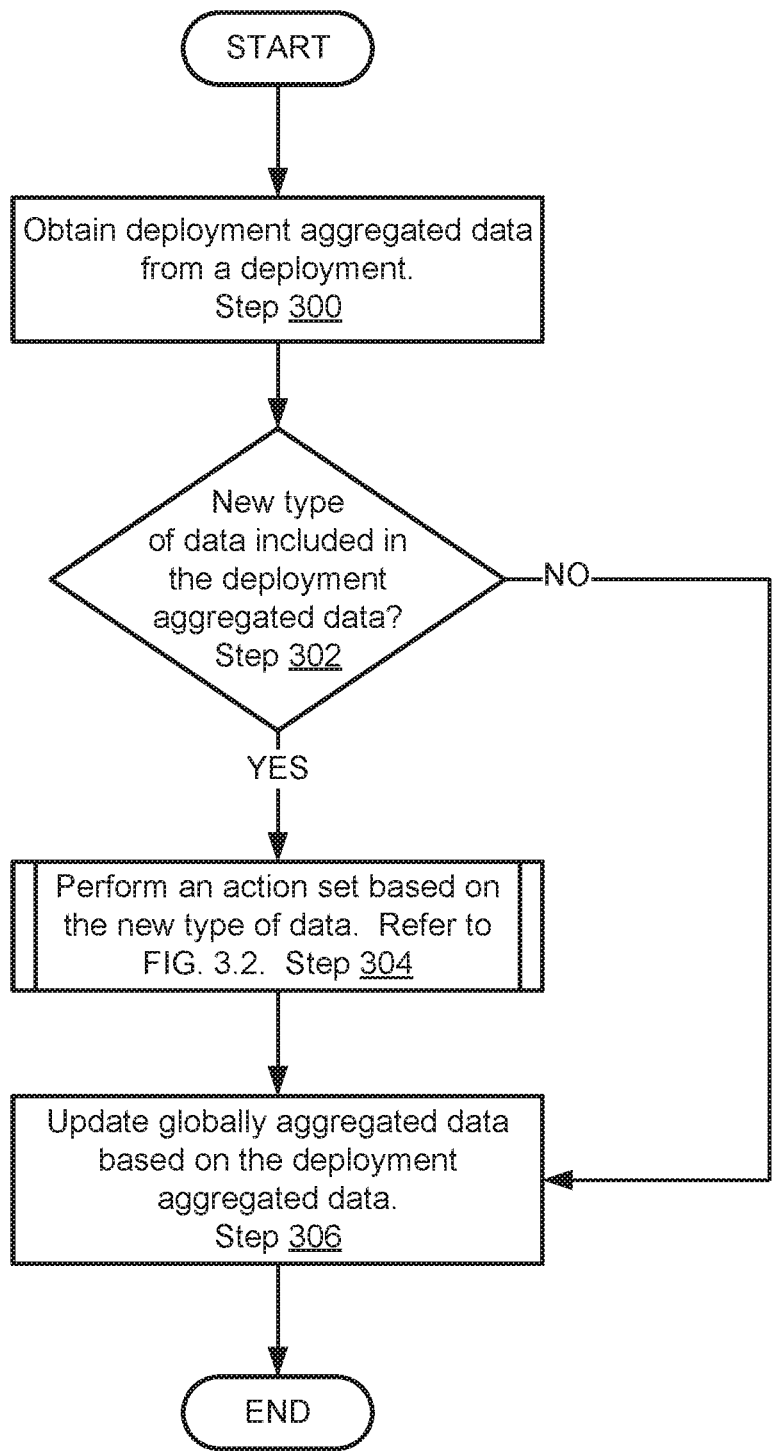
FIG. 3.1

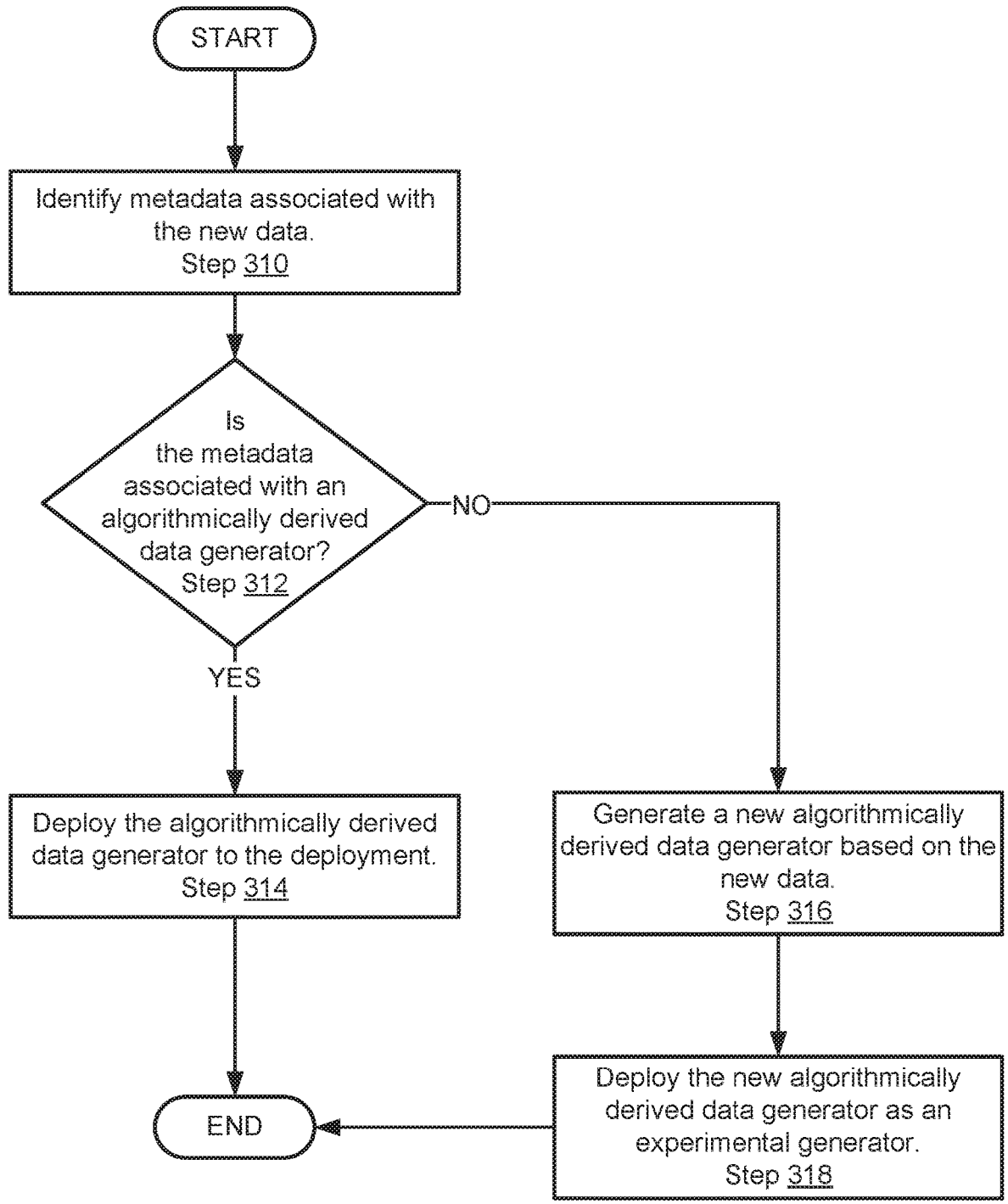
FIG. 3.2

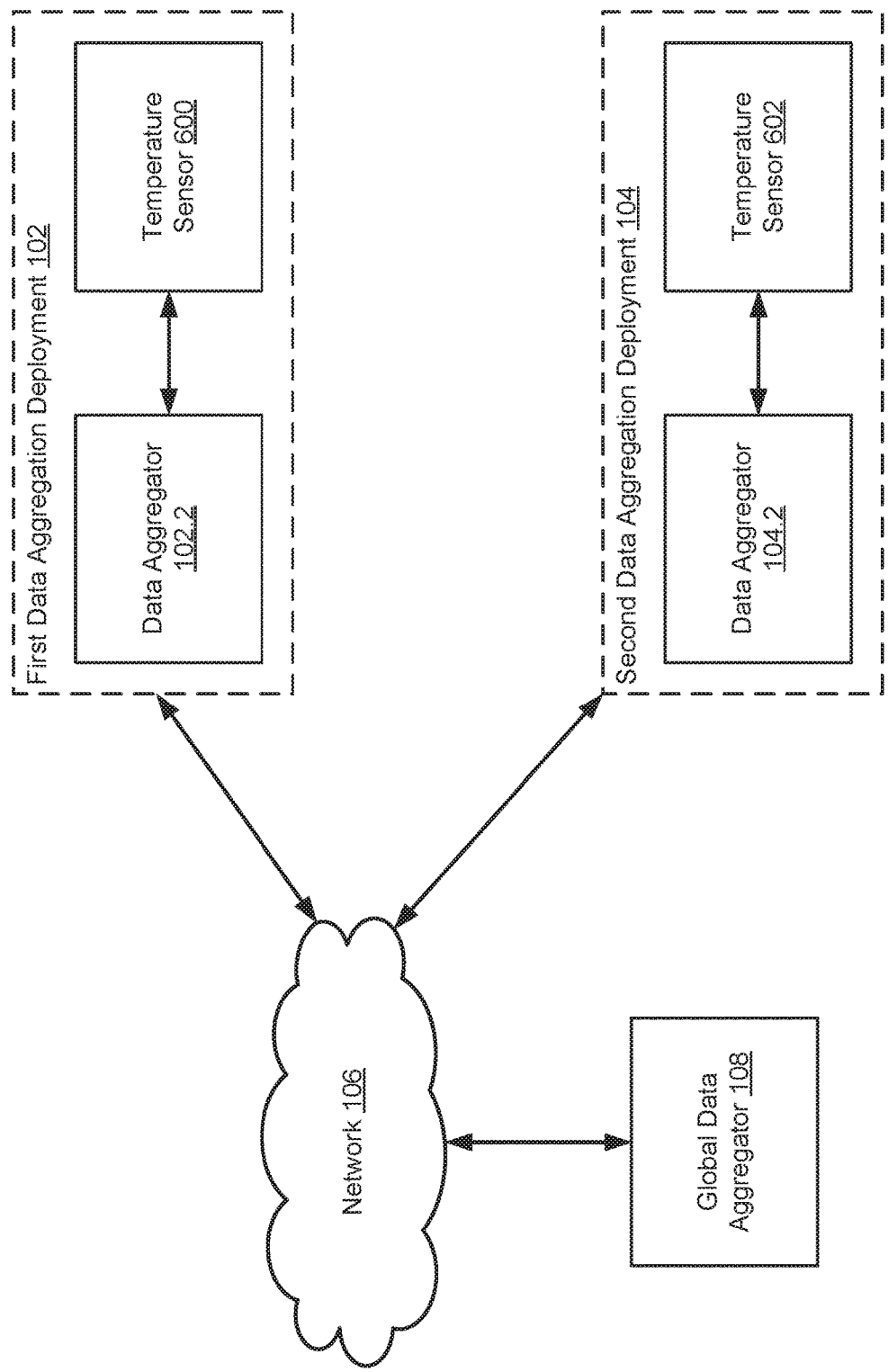
FIG. 6.1

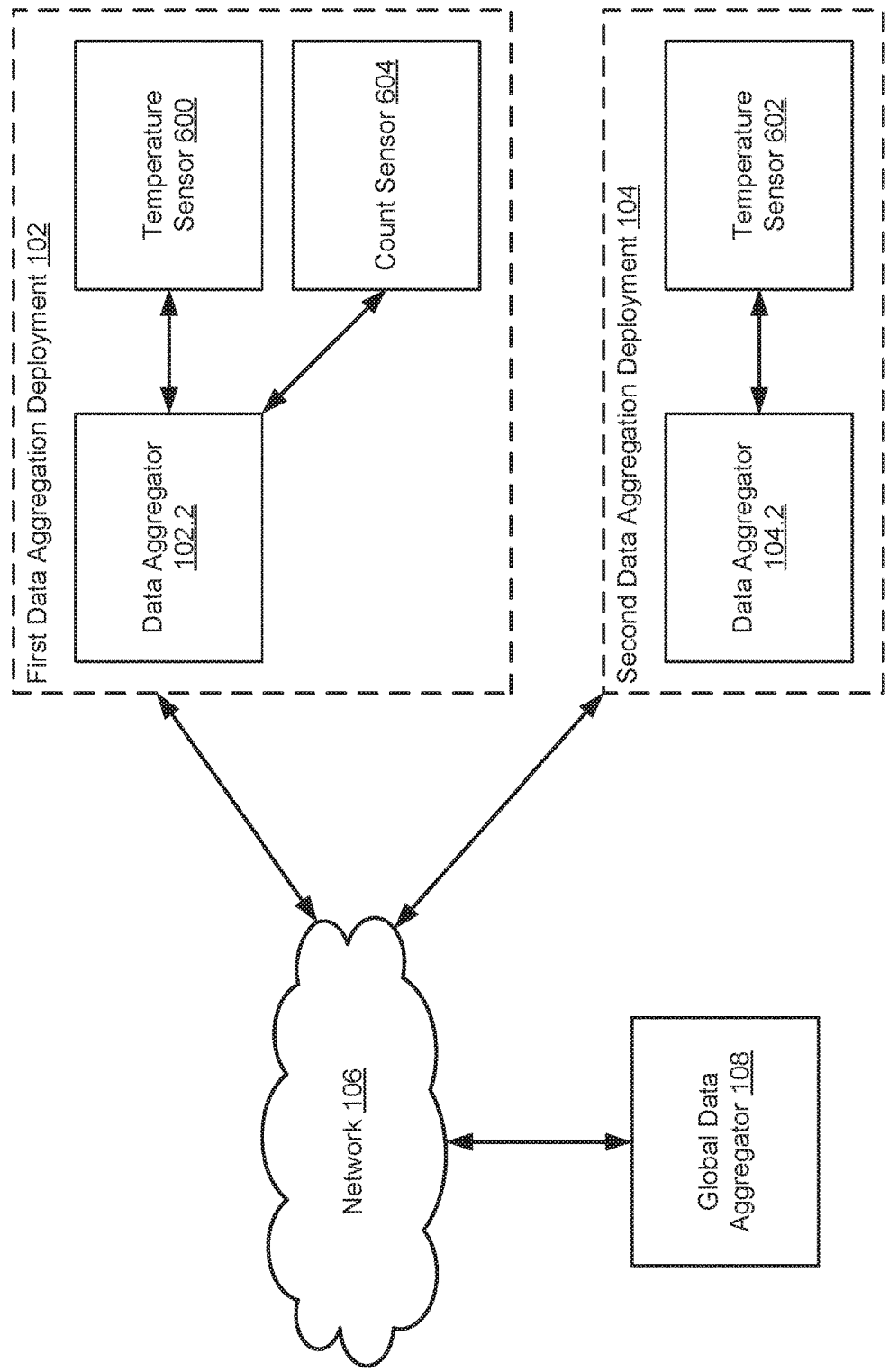
FIG. 6.2

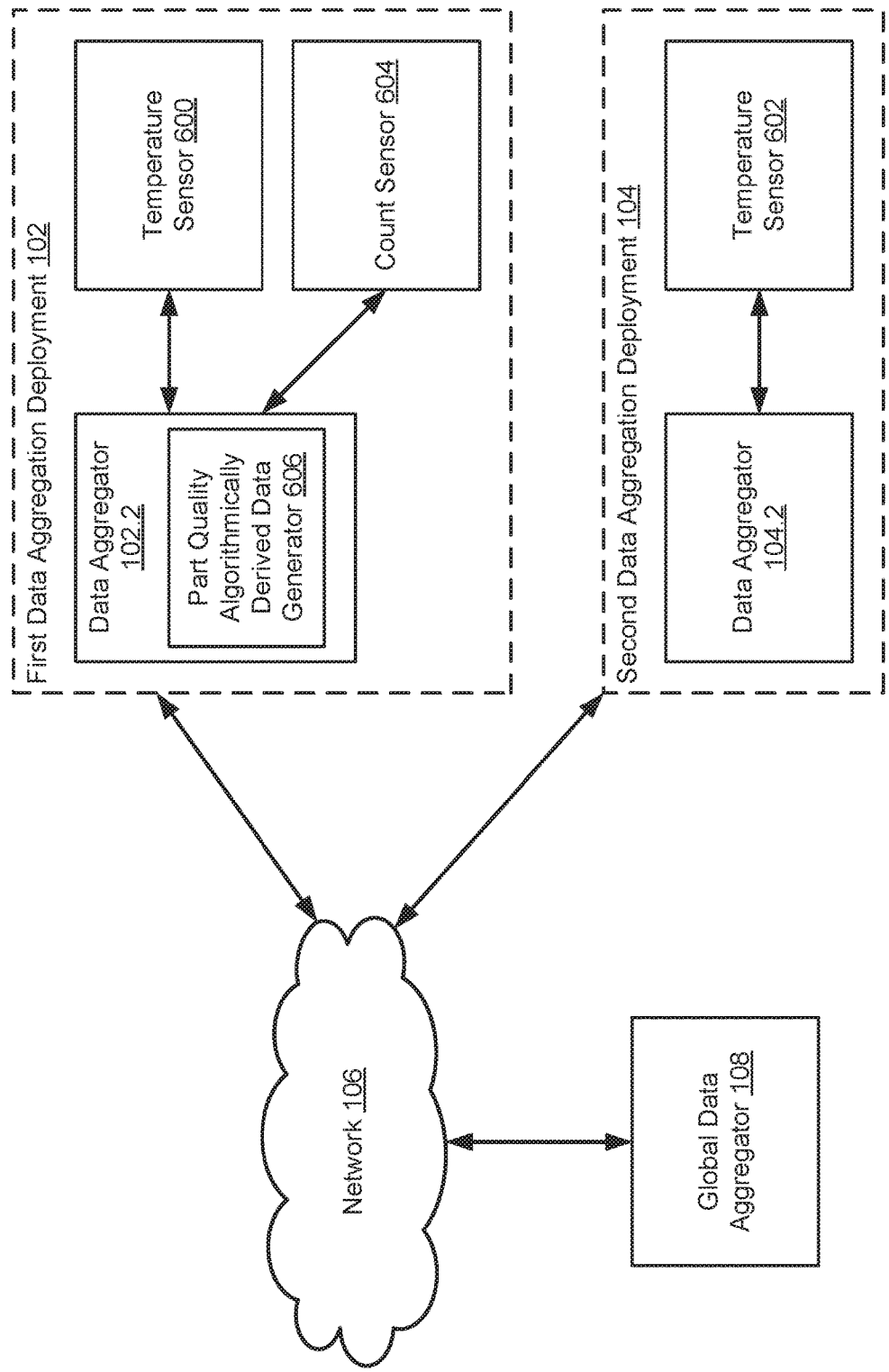
FIG. 6.3

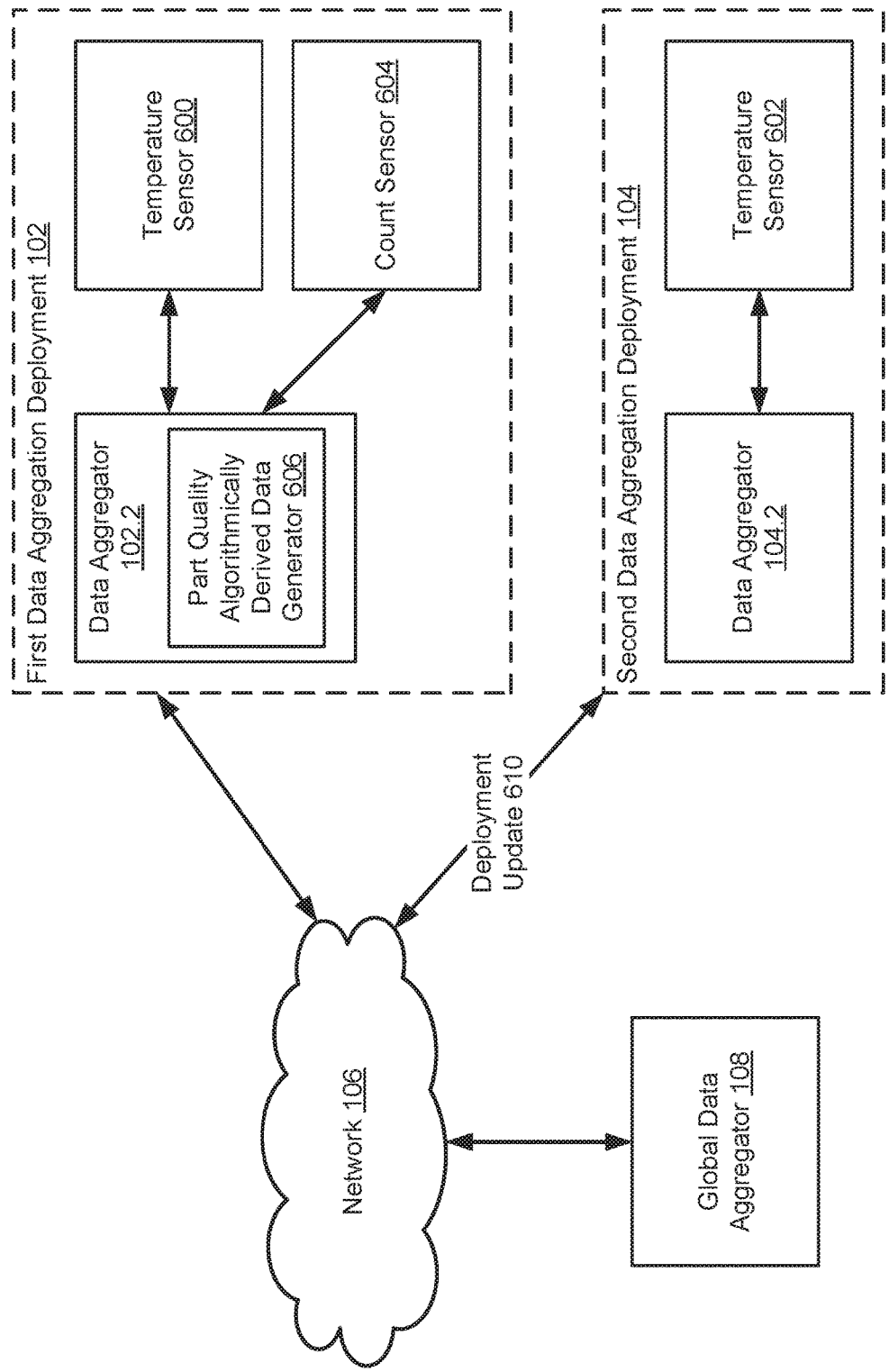
FIG. 6.4

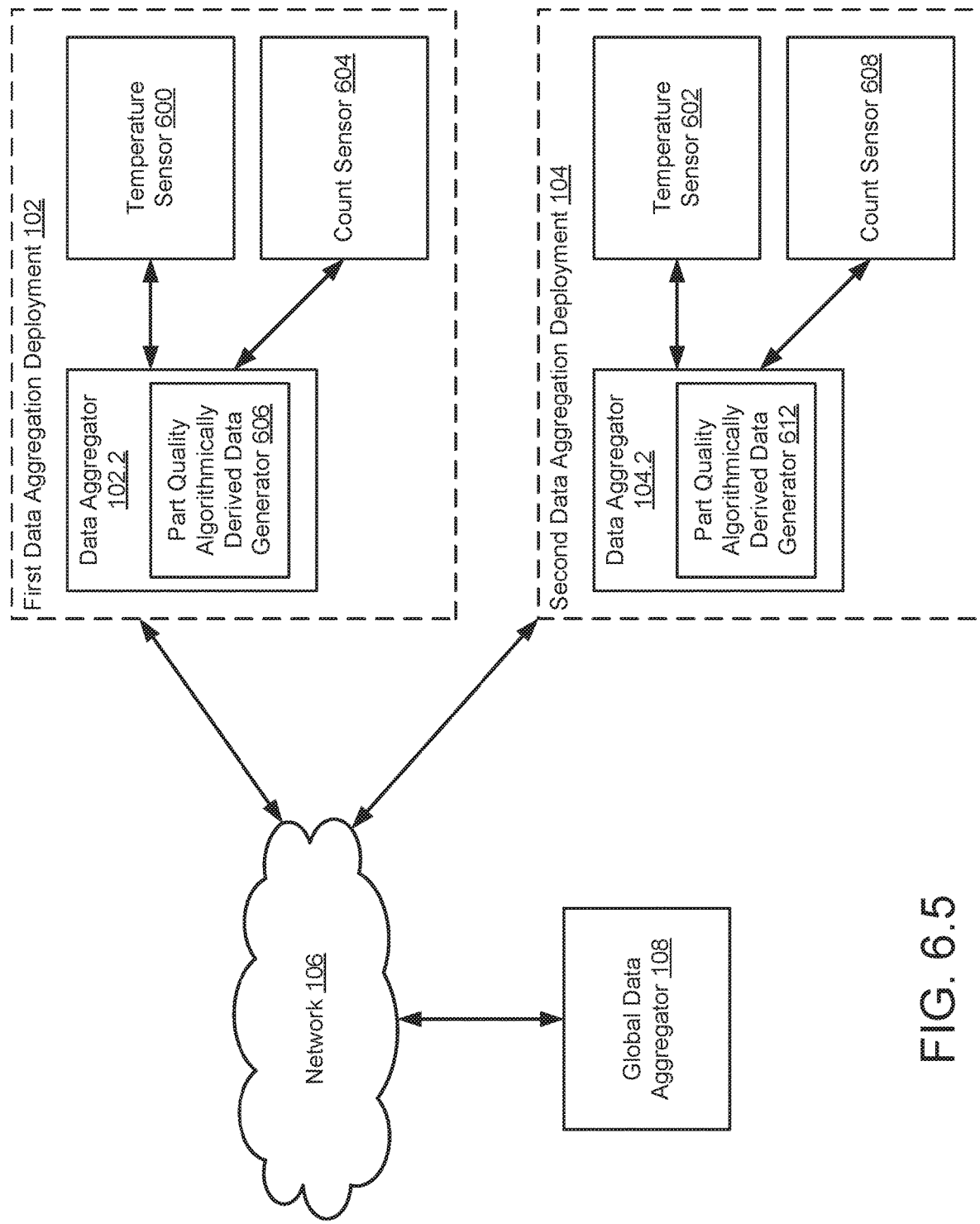
FIG. 6.5

SYSTEM AND METHOD FOR MANAGEMENT OF DATA FROM DEPLOYMENTS

BACKGROUND

Devices may generate data that includes any type and quantity of information. As data is generated, it may need to be stored to be accessible in the future. Additionally, different types of data may be more valuable than other types of data. Depending on the relative value of different types of data, it may be more or less important to obtain and/or retain data for future access.

SUMMARY

In one aspect, a global data aggregator for managing deployments in accordance with one or more embodiments of the invention includes persistent storage and a global data manager. The persistent storage stores globally aggregated data and an algorithm repository. The global data manager obtains deployment aggregated data from a deployment of the deployments; makes a determination that a new type of data is included in the deployment aggregated data; and in response to the determination: performs an action set, based on the new type of the data, to modify a content of future deployment aggregated data obtained from the deployment.

In one aspect, a method of managing deployments in accordance with one or more embodiments of the invention includes obtaining deployment aggregated data from a deployment of the deployments; making a determination that a new type of data is included in the deployment aggregated data; and in response to the determination: performing an action set, based on the new type of the data, to modify a content of future deployment aggregated data obtained from the deployment.

In one aspect, a non-transitory computer readable medium in accordance with one or more embodiments of the invention includes computer readable program code, which when executed by a computer processor enables the computer processor to perform a method for managing deployments. The method includes obtaining deployment aggregated data from a deployment of the deployments; making a determination that a new type of data is included in the deployment aggregated data; and in response to the determination: performing an action set, based on the new type of the data, to modify a content of future deployment aggregated data obtained from the deployment.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example global data aggregator in accordance with one or more embodiments of the invention.

FIG. 1.3 shows a diagram of an example data aggregator in accordance with one or more embodiments of the invention.

FIG. 2.1 shows a diagram of an example of deployment aggregated data in accordance with one or more embodiments of the invention.

FIG. 2.2 shows a diagram of an example algorithm repository in accordance with one or more embodiments of the invention.

FIG. 3.1 shows a flowchart of a method of managing data in accordance with one or more embodiments of the invention.

FIG. 3.2 shows a flowchart of a method of performing an action set in accordance with one or more embodiments of the invention.

FIG. 6.1 shows a diagram of an example system, similar to the system FIG. 1.1, at a first point in time.

FIG. 6.2 shows a diagram of the example system of FIG. 6.1 after adding a count sensor to the system.

FIG. 6.3 shows a diagram of the example system of FIG. 6.2 after instantiating a part quality algorithmically derived data generator.

FIG. 6.4 shows a diagram of the example system of FIG. 6.3 after determining that a deployment should be remediated.

FIG. 6.5 shows a diagram of the example system of FIG. 6.4 after adding a count sensor and instantiating another instance of the part quality algorithmically derived data generator.

DETAILED DESCRIPTION

Figure 4:
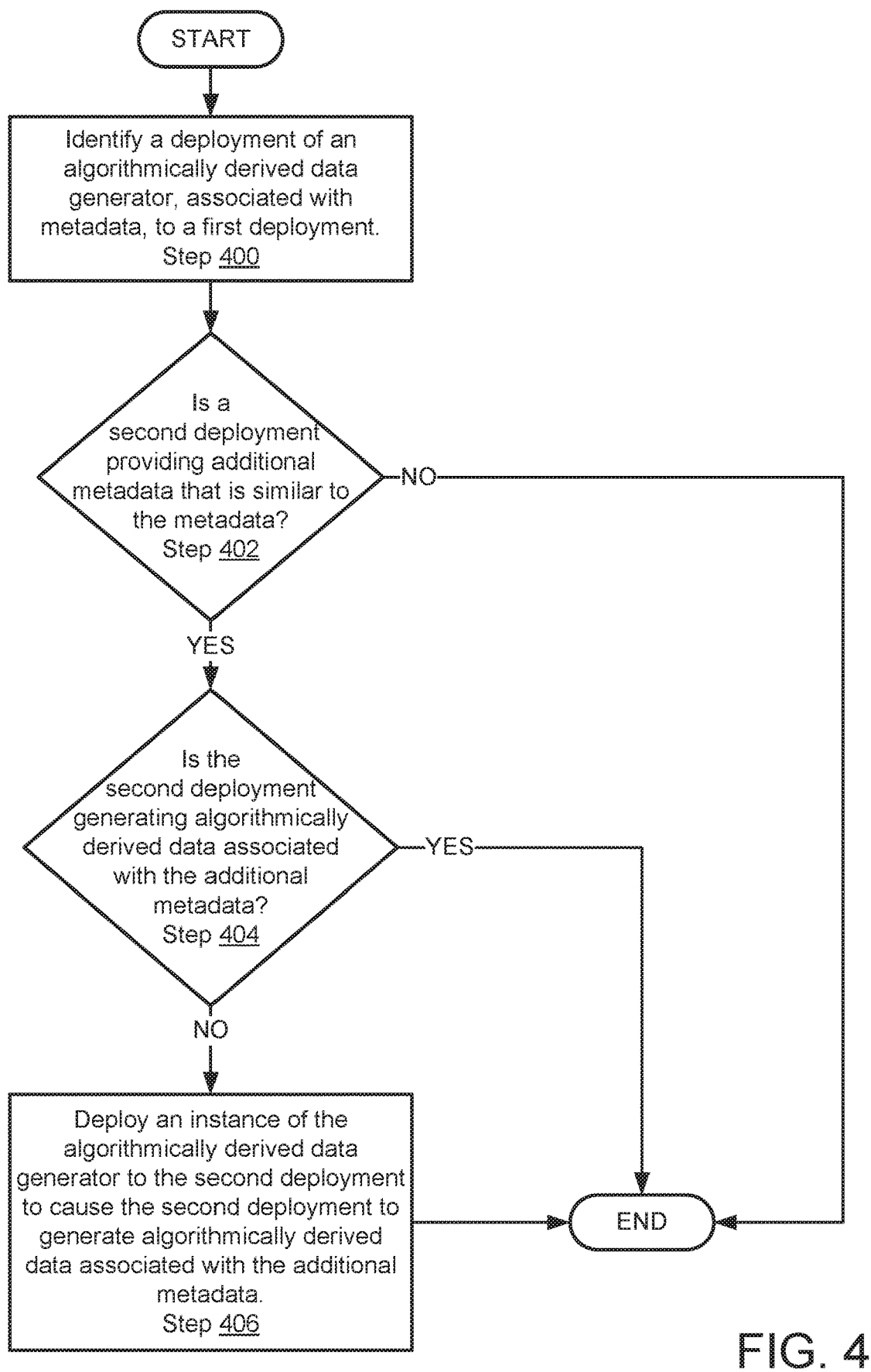
FIG. 4 shows a flowchart of a method of managing deployments in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. A system in accordance with embodiments of the invention may manage data by ensuring that valuable data that could be generated/obtained is generated/obtained. To ensure that valuable data is generated/obtained, a system in accordance with one or more embodiments of the invention may modify the operation/functionality of one or more deployments that generate/obtain portion of the data managed by the system. The system may perform such modifications based on information obtained from multiple deployments.

For example, as the deployments change over time, the deployments may become able to generate more valuable data. In such scenario, the system may automatically deploy data generators to the deployments to cause the deployments to generate the more valuable data.

In another example, as the deployments change over time, the system may identify that a particular deployment lacks the ability to obtain data that other deployments are able to obtain. In such a scenario, the system may automatically generate updates that, when implemented by a deployment, enable the deployment to obtain the data.

In a still further example, over time the value (e.g., utilization rate) of different types of data may change. In response to such changes in the value of data, the system may automatically cause deployments to change their operation to reflect the changes in the value of the different types of data.

By doing so, embodiments of the invention may reduce a cognitive burden of managing the process of data generation in an environment where large amounts of data are being generated. Specifically, embodiments of the invention may provide a system that automatically modifies the operation of deployments with limited to no interaction with users. By doing so, embodiments of the invention may provide a system that provides more valuable data that may otherwise be overlooked.

FIG. 1.1 shows a system in accordance with one or more embodiments of the invention. The system may facilitate the management of data from any number of sources.

In one or more embodiments of the invention, the system includes data aggregation deployments (100). The data aggregation deployments (100) may obtain data from any number of sources and aggregate it. Additionally, the data aggregation deployments (100) may generate additional data that is derived (e.g., algorithmically derived data) from the obtained data. The data aggregation deployments (100) may provide the data and/or derived data to a global data aggregator (108) for management of the data.

Each of the data aggregation deployments (100) may be a dynamic entity. That is, the members (i.e., devices) of each of the data aggregation deployments (100) may change over time. For example, devices may be removed from or added to a data aggregation deployment. When such changes in membership take place, the data obtaining and/or generating (e.g., deriving, making) capabilities of the data aggregation deployment may change. A system in accordance with one or more embodiments of the invention may include any number of data aggregation deployments (e.g., 102, 104) without departing from the invention.

In one or more embodiments of the invention, the system includes a global data aggregator (108). A global data aggregator may: (i) manage data obtained from any number of data aggregation deployments (100) and (ii) manage at least a portion of the operations of the data aggregation deployments (100). To manage at least a portion of the operations of the data aggregation deployments (100), the global data aggregator (108) may deploy algorithmically derived data generators and/or provide information relevant to increasing the value of data obtained and/or generated by the data aggregation deployments (100).

All, or a portion, of the components of the system illustrated in FIG. 1.1 may be operably connected to each other and/or other entities via any combination of wired and/or wireless connections. For example, the aforementioned components may be operably connected, at least in part, via a network (106). The network (106) may be any type of communications network and provide communication services by implementing any communication protocol. The aforementioned components of the system may be operably connected to the network (106) which, in turn, facilitates communications between the aforementioned components and/or other components of the system. To facilitate such communications, any number of entities of the system of FIG. 1.1 may include functionality to communicate using any number of communication protocols implemented using any number and/or type of wired and/or wireless connection. Each component of the system of FIG. 1.1 is discussed below.

The data aggregation deployments (100) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-5. The data aggregation deployments (100) may be implemented using other types of computing devices without departing from the invention. For additional details regarding computing devices, refer to FIG. 7.

The data aggregation deployments (100) may be implemented using logical devices without departing from the invention. For example, the data aggregation deployments (100) may be implemented using virtual machines or other types of logical entities that utilize computing resources of any number of physical computing devices to provide the functionality of the data aggregation deployments (100). The data aggregation deployments (100) may be other types of logical devices without departing from the invention.

The data aggregation deployments (100) may be implemented using any number (e.g., 0, 1, 2, 3, etc.) of data generation devices without departing from the invention. For example, the data aggregation deployments (100) may be implemented using sensors that generate data (i.e., data generation devices). The sensors may generate data by measuring one or more properties of an environment in which the sensor exists. The data aggregation deployments (100) may be implemented using other types of data generation devices without departing from the invention. For example, the data generation devices may be computing devices operably connected to sensors or other computing devices from which the computing devices obtain data.

In one or more embodiments of the invention, the data aggregation deployments (100): (i) obtain data from any number of data sources (e.g., data providers (102.4, 104.4)), (ii) generate new data (e.g., algorithmically derived data) based on the obtained data, and (iii) provide all, or a portion, of the data and/or the new data to the global data aggregator (108). When obtaining data and/or generating new data, the data aggregation deployments (100) may do so in cooperation with the global data aggregator (108).

For example, the global data aggregator (108) may instruct the data aggregation deployments (100) with respect to the data to be obtained and the new data to be generated based on the obtained data.

In another example, the data aggregation deployments (100) may provide information to the global data aggregator (108) regarding changes in the operation of the data aggregation deployments (100). By doing so, the global data aggregator (108) may be enabled to analyze the changes to the data aggregation deployments (100) to identify changes that the data aggregation deployments (100) may implement to improve their operations (e.g., improve the quality of data being obtained/generated, decrease the computing resources cost of obtaining/generating data, etc.).

To provide the above noted functionality of the data aggregation deployments (100), the data aggregations deployments (e.g., 102, 104) may include a data aggregator (102.2, 104.2) and one or more data providers (102.4, 104.4). Each component of the data aggregation deployments (100) is discussed below.

The one or more data providers (e.g., 102.4) may provide data to a respective data aggregator (102.2 104.2) of a data aggregation deployment (e.g., 102, 104). For example, one, two, three, or any number of data providers (e.g., 102.4) may obtain data and provide the obtained data to a corresponding data aggregator (e.g., 102.2). The data providers (e.g., 102.4) may be any type of physical and/or logical device that includes functionality to obtain and/or provide data to a data aggregator.

For example, a data provider may be a sensor operably connected to a data aggregator. The sensor may provide data in the form of sensor measurements to the data aggregator. The sensor may be, for example, a count sensor, distance sensor, temperature sensor, camera, or any other type of device that may generate data based on an environment in which the sensor exists. Such sensor may be utilized in, for example, product production lines, assembly plants, office buildings, retail outlets, and/or any other type of location.

In another example, the data provider may be a sensor operably connected to a computing device. The computing device may obtain data generated by the sensor, optionally generate new data and/or modify the obtained data, and provide the data, new data, and/or modified data to a data aggregator.

In a still further example, the data provider be a data storage (e.g., a computing device that includes persistent storage for storing data). The data storage may include data (e.g., sensor readings taken at one or more points in time) obtained by any entity. The data storage may provide all, or a portion, of the data to a data aggregator.

The one or more data providers (102.4, 104.4) may provide data in cooperation with the respective data aggregators (102.2, 104.2) of the data aggregation deployments (100). For example, the data aggregators (102.2, 104.2) may configure, program, or otherwise control through any mechanism the type, quantity, and/or other parameters that define when, how, and what data the data providers provide. The data providers (102.4, 104.4) may operate independently of the data aggregators (102.2, 104.2) without departing from the invention.

In one or more embodiments of the invention, the one or more data providers (102.4, 104.4) are internet of things (IOT) devices. Such devices may obtain data via one or more on-board sensors and provide the obtained data via one or more operable connections.

The data aggregator (102.2, 104.2) of each of the data aggregation deployments (100) may aggregate data from one or more of the data providers (102.4, 104.4) of the respective deployment, generate new data based on all, or a portion, of the aggregated data, and provide all, or a portion, of the aggregated and/or new data to the global data aggregator (108). To do so, the data aggregator (102.2, 104.2) may cooperate with the global data aggregator (108) with respect to the data to be aggregated, the new data to be generated, and/or other aspects of the data aggregation, generation, and/or provisioning services provided by the data aggregators. For additional details regarding data aggregators, refer to FIG. 1.3.

The global data aggregator (108) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-5. The global data aggregator (108) may be implemented using other types of computing devices without departing from the invention. For additional details regarding computing devices, refer to FIG. 7.

The global data aggregator (108) may be implemented using logical devices without departing from the invention. For example, the global data aggregator (108) may be implemented using virtual machines or other types of logical entities that utilize computing resources of any number of physical computing devices to provide the functionality of the global data aggregator (108). The global data aggregator (108) may be other types of logical devices without departing from the invention.

The global data aggregator (108) may provide data management and/or operational management services. To provide data management services, the global data aggregator (108) may obtain data from the data aggregation deployments (100), organize the obtained data, and/or provide access to the organized obtained data. Additionally, the global data aggregator (108) may monitor the relative value of different types of data being obtained, generated, and/or provided by the data aggregation deployments (100).

To provide operational management services, the global data aggregator (108) may monitor and/or modify the manner in which the data aggregation deployments (100) are obtaining, generating, and/or providing data to the global data aggregator (108). The global data aggregator (108) may make such modifications based on, for example, a determination that a deployment could obtain, generate and/or provide more valuable data, different data, and/or additional data.

The global data aggregator (108) may provide additional, fewer, and/or different functionalities without departing from the invention. For additional details regarding the global data aggregator (108), refer to FIG. 1.2.

While the system of FIG. 1.1 has been illustrated and described as including a limited number of specific components, a system in accordance with one or more embodiments of the invention may include additional, fewer, and/or different components without departing from the invention.

As discussed above, a global data aggregator in accordance with one or more embodiments of the invention may provide data management services and/or operational management services. FIG. 1.2 shows a diagram of an example global data aggregator (120) in accordance with one or more embodiments of the invention. The global data aggregator (108) of FIG. 1.1 may be similar to the example global data aggregator (120).

To provide the above noted functionality of the example global data aggregator (120), the example global data aggregator (120) may include a global data manager (122) and/or persistent storage (130). Each of these components of the example global data aggregator (120) is discussed below.

In one or more embodiments of the invention, the global data manager (122) is implemented as a logical entity that utilizes the computing resources of the example global data aggregator (120) for performing its functionality. For example, the global data manager (122) may be implemented as computer instructions stored in persistent storage (e.g., 130) that when executed by a processor of the example global data aggregator (120) and/or other entities give rise to the functionality of the global data manager (122).

In one or more embodiments of the invention, all, or a part, of the functionality of the global data manager (122) is implemented using a specialized hardware device (e.g., circuitry). The specialized hardware device may be, for example, a digital signal processor, a field programmable gate array, or an application specific integrated circuit. The functionality of the global data manager (122) may be provided using other types of specialized hardware devices without departing from the invention.

In one or more embodiments of the invention, the global data manager (122) provides the data management and/or the operational management services provided by the example global data aggregator (120). To do so, the global data manager (122) may perform all, or a portion, of the methods illustrated in FIGS. 3.1-5.

The persistent storage (130) may be implemented using one or more physical and/or logical devices that provides storage resources to the example global data aggregator (120). If implemented using one or more physical devices, the persistent storage (130) may include hard disk drives, solid state drives, tape drives, or any other type of physical device for providing storage resources for storing data. If implemented using one or more logical devices, the persistent storage (130) may utilize the physical storage resource of any number of computing devices to provide storage resources for storing data. For example, the persistent storage (130) may include virtualized storage.

The persistent storage (130) may store data structures utilized by the global data manager (122) and/or other entities. The data structures may include globally aggregated data (132), an algorithm repository (134), and/or a globally aggregated data utilization repository (136). Each of these data structures is discussed below.

The globally aggregated data (132) may be a data structure that includes data obtained from one or more deployments. For example, the globally aggregated data (132) may include data, algorithmically derived data, and/or metadata associated with the data and/or the algorithmically derived data. The globally aggregate data (132) may have any structure (e.g., a list, database, linked list, table, etc.

In one or more embodiments of the invention, the globally aggregated data (132) includes information regarding the relative confidence in the accuracy of the data included in the globally aggregated data (132). For example, derived data may be given a low confidence score if the algorithmically derived data generator that produced the derived data has not been in existence for a long period of time or has otherwise only generated a small amount of derived data. In such scenarios, the low relative confidence score for the data may reflect that there is little information regarding the utilization and/or valuation of the derived data by other entities. For additional details regarding valuation of data, refer to the discussion with respect to the globally aggregated data utilization repository (136), discussed below.

The algorithm repository (134) may be a data structure that includes information that may be used to deploy a derived data generator to one or more platforms. The information included in the algorithm repository (134) may associate different portions of the data with different types of data. By doing so, different algorithmically derived data generators may be preferentially selected depending on a type of data upon which the deployed algorithmically derived data generators may operate. For additional details regarding the algorithm repository (134), refer to FIG. 2.2.

The globally aggregated data utilization repository (136) may be a data structure that includes information that may be used to determine the relative value of data obtained from the deployments. For example, different types of data obtained from the deployments may have more value (e.g., higher utilization rates, higher demand) than other types of data. The globally aggregated data utilization repository may be implemented as, for example, a ranking of the types of data obtained from the deployments. The globally aggregated data utilization repository may be implemented using different types of structures (e.g., tables, linked lists, databases, etc.) without departing from the invention.

In one or more embodiments of the invention, the information included in the globally aggregated data utilization repository (136) may be used to rank the algorithmically derived data generators. For example, the relative values of the derived data generated by the algorithmically derived data generators may be used to rank the corresponding algorithmically derived data generators.

While the data structures of FIG. 1.2 have been illustrated as including a limited amount of specific information, the aforementioned data structures may include additional, different, and/or less information without departing from the invention. Additionally, the aforementioned data structures may be broken down into any number of data structures, be combined with other data structures that include different types information, have different structures than that illustrated in FIG. 1.2, and/or may be spanned across any number of persistent storages without departing from the invention.

While the example global data aggregator (120) of FIG. 1.2 has been illustrated and described as including a limited number of specific components, a global data aggregator in accordance with one or more embodiments of the invention may include additional, fewer, and/or different components without departing from the invention.

As discussed above, a global data aggregator in accordance with one or more embodiments of the invention may provide management services to any number of deployments (e.g., 102, 104) that include data aggregators. FIG. 1.3 shows a diagram of an example data aggregator (140) in accordance with one or more embodiments of the invention. The data aggregators (102.2, 104.2) of FIG. 1.1 may be similar to the example data aggregator (140).

To provide the above noted functionality of the example data aggregator (140), the example data aggregator (140) may include a deployment data manager (142) and/or persistent storage (150). Each of these components of the example data aggregator (140) is discussed below.

In one or more embodiments of the invention, the deployment data manager (142) is implemented as a logical entity that utilizes the computing resources of the example data aggregator (140) for performing its functionality. For example, the deployment data manager (142) may be implemented as computer instructions stored in persistent storage (e.g., 130) that when executed by a processor of the example data aggregator (140) and/or other entities give rise to the functionality of the deployment data manager (142).

In one or more embodiments of the invention, all, or a part, of the functionality of the deployment data manager (142) is implemented using a specialized hardware device (e.g., circuitry). The specialized hardware device may be, for example, a digital signal processor, a field programmable gate array, or an application specific integrated circuit. The functionality of the deployment data manager (142) may be provided using other types of specialized hardware devices without departing from the invention.

In one or more embodiments of the invention, the deployment data manager (142) provides data management services. To do so, the deployment data manager (142) may perform all, or a portion, of the methods illustrated in FIGS. 3.1-5.

The data management services provided by the deployment data manager (142) may include: (i) obtaining data from one or more data providers, (ii) aggregating the obtained data, (iii) generating derived data based on the obtained data, (iv) providing the obtained data, derived data, and/or metadata associated with the data and/or derived data to a global data aggregator (and/or other entities), and/or (v) managing updates to a deployment in which the example data aggregator (140) resides.

To obtain the data from the one or more data providers, the deployment data manager (142) may manage the functionality of the data providers. For example, the deployment data manager (142) may manage when, how, and/or what data the data providers provide to the example data aggregator (140). To aggregate the obtained data, the deployment data manager (142) may aggregate data obtained from any number of data providers. The aggregation may include, for example, storing copies of the data and/or organizing the data. The aggregation may also include storing metadata regarding the data.

To generate the derived data, the deployment data manager (142) may manage any number of algorithmically derived data generators. The algorithmically derived data generators may generate the derived data based on the obtained data and/or metadata regarding the obtained data. To manage the algorithmically derived data generators, the deployment data manager (142) may instantiate, terminate, and/or otherwise configure the operation of the algorithmically derived data generators. The deployment data manager (142) may provide such management services for the algorithmically derived data generators in cooperation with one or more global data aggregators. For example, the global data aggregators may notify the deployment data manager (142) of the algorithmically derived data generators that are to be supported (i.e., operating) by the example data aggregator (140).

The algorithmically derived data generators may be any type of entity (e.g., physical hardware, logical device, etc.) without departing from the invention. For example, the algorithmically derived data generators may be implemented using functionality provided by hardware devices of the example data aggregator (140). In another example, the algorithmically derived data generators may be implemented using executable code that when executed using computing resources (e.g., processor cycles, memory resources, storage resources, communications resources, etc.) give rise to the functionality of the algorithmically derived data generators. In a still further example, the algorithmically derived data generators may be implemented using a scripting language that when performed by an entity hosted by the example data aggregator (140) performs the functionality of one or more of the algorithmically derived data generators.

The derived data generated by an algorithmically derived data generator may include any type and/or quantity of data. The derived data may be based on any quantity (e.g., all or a portion) of data obtained from the data generators.

The persistent storage (150) may be implemented using one or more physical and/or logical devices that provides storage resources to the example data aggregator (140). If implemented using one or more physical devices, the persistent storage (150) may include hard disk drives, solid state drives, tape drives, or any other type of physical device for providing storage resources for storing data. If implemented using one or more logical devices, the persistent storage (150) may utilize the physical storage resource of any number of computing devices to provide storage resources for storing data. For example, the persistent storage (150) may include virtualized storage.

The persistent storage (150) may store data structures utilized by the deployment data manager (142) and/or other entities. The data structures may include deployment aggregated data (152), a deployed algorithm repository (154), and/or deployment updates (156). Each of these data structures is discussed below.

The deployment aggregated data (152) may be a data structure that includes data obtained from data providers, derived data based on the obtained data, and/or metadata regarding the obtained and/or derived data. For additional details regarding the deployment aggregated data (152), refer to FIG. 2.1.

The deployed algorithm repository (154) may be a data structure that includes information regarding algorithmically derived data generators that are deployed to the example data aggregator (140). For example, the deployed algorithm repository (154) may include one or more of: (i) a listing of one or more of the algorithmically derived data generators deployed to the example data aggregator (140), (ii) computer instructions (e.g., computer code) corresponding to one or more of the algorithmically derived data generators deployed to the example data aggregator (140), (iii) scripts (e.g., high level instructions that may cause an entity to perform one or more actions) corresponding to one or more of the algorithmically derived data generators deployed to the example data aggregator (140), and/or (iv) other information regarding algorithmically derived data generators deployed to the example data aggregator (140). The deployed algorithm repository (154) may be any type of data structure and include amount of data without departing from the invention.

The deployment updates (156) may be a data structure that includes information regarding updates that may be implemented by a deployment to which the example data aggregator (140) belongs. For example, a global data aggregator may send an update to the example data aggregator (140) indicating that a change in the operation of a deployment to which the example data aggregator (140) belongs should be made. The change may, for example, cause the deployment to provide more valuable data after implementing the change. The change may cause other changes in the operation of a deployment without departing from the invention.

For example, a change to a deployment provided by a global data aggregator may specify that a new data provider be added to the deployment. In another example, the change to the deployment provided by the global data aggregator may specify a change in operation of an existing data provider of the deployment. The changes provided by the global data aggregator and/or included in the deployment updates (156) may specify any number and/or type of changes to the structure and/or functionality of a deployment to which the example data aggregator (140) belongs. A global data aggregator may provide such changes by identifying data that being produced by a second deployment and not being produced by the deployment to which the example data aggregator (140) belongs. The global data aggregator may provide such changes via other methods without departing from the invention.

While the data structures of FIG. 1.3 have been illustrated as including a limited amount of specific information, the aforementioned data structures may include additional, different, and/or less information without departing from the invention. Additionally, the aforementioned data structures may be broken down into any number of data structures, be combined with other data structures that include different types information, have different structures than that illustrated in FIG. 1.3, and/or may be spanned across any number of persistent storages without departing from the invention.

As discussed above, a system as illustrated in FIG. 1.1 in accordance with one or more embodiments may utilize data structures when/before/after operating. FIGS. 2.1-2.2 shows diagrams of data structures that may be utilized by the system of FIG. 1.1.

FIG. 2.1 shows a diagram of example deployment aggregated data (200) in accordance with one or more embodiments of the invention. The deployment aggregated data (152) of FIG. 1.3 may be similar to the example deployment aggregated data (200). As discussed above, deployment aggregated data may include data obtained from data providers, derived data based on the obtained data, and/or metadata associated with the data and/or the derived data.

The example deployment aggregated data (200) may be implemented using any number of entries (202, 204). Each of the entries may include, for example, a source identifier (202.2), data (202.4), algorithmically derived data (202.6), and/or metadata (202.8).

The source identifier (202.2) may be an identifier of an entity from which the data (202.4) is obtained. For example, the source identifier (202.2) may be the name or other type of identifier associated with the data provider from which the data (202.4) was obtained.

The data (202.4) may be data obtained from a data provider. The data (202.4) may be any type and/or quantity of data.

The algorithmically derived data (202.6) may be data that is based on the data (202.4). The algorithmically derived data (202.6) may be generated by an algorithmically derived data generator. The algorithmically derived data generator may generate the algorithmically derived data (202.6) based on the data (202.4). The algorithmically derived data (202.6) may be based on additional, different, and/or less data without departing from the invention. For example, the algorithmically derived data (202.6) may be based on data (e.g., 202.4) from any number of entries.

In one or more embodiments of the invention, only a portion of the entries include algorithmically derived data (202.6). For example, not all data (e.g., 202.4) may be used as a basis for generating algorithmically derived data (202.6). Accordingly, not all of the entries of the example deployment aggregate data (200) may include algorithmically derived data (202.6).

The metadata (202.8) may include information regarding the data (202.4) and/or the algorithmically derived data (202.6). The metadata (202.8) include any amount and/or type of information regarding the data (202.4) and/or the algorithmically derived data (202.6) without departing from the invention.

In one or more embodiments of the invention, the metadata (202.8) includes information regarding a type of the data (202.4) and/or the algorithmically derived data (202.6). For example, the metadata (202.8) may indicate one or more of the following: (i) file format, (ii) contents, and (iii) a generation method. The metadata (202.8) include additional, different, and/or less information regarding the data (202.4) and/or algorithmically derived data (202.6) without departing from the invention.

FIG. 2.2 shows a diagram of an example algorithm repository (210) in accordance with one or more embodiments of the invention. The algorithm repository (134) of FIG. 1.2 may be similar to the example algorithm repository (210). As discussed above, an algorithm repository may include information regarding algorithmically derived data generators that may be deployed to deployments to cause algorithmically derived data to be generated by data aggregators of the deployments. The information may include, for example, algorithmically derived data generators (e.g., 212.2) and/or rankings (212.4) of the algorithmically derived data generators that may be deployed.

The example algorithm repository (210) may be implemented using any number of entries (212, 214). Each of the entries may include, for example, an algorithmically derived data generator (212.2) and/or a ranking (212.4) of the associated algorithmically derived data generator (212.2) by virtue of being included in the same entry (e.g., 212).

The algorithmically derived data generator (212.2) may be a data structure that includes information that may be used to deploy and algorithmically derived data generator to a deployment. For example, the algorithmically derived data generator (e.g., 212.2) may include one or more of: (i) an executable entity that when executed by a deployment causes the deployment (e.g., a data aggregator of the deployment) to provide the functionality of an algorithmically derived data generator, (ii) a script that when performed by an entity hosted by a deployment causes the deployment to perform the functionality of the algorithmically derived data generator, (iii) instructions for obtaining an executable and/or script, (iv) instructions to begin performing the functionality of an algorithmically derived data generator (e.g., an algorithmically derived data generator already present in a deployment), (v) instructions to generate a new instance of an existing algorithmically derived data generator deployed to a deployment and cause the new instance to operate on data being and/or will be obtained by a deployment.

The rankings (212.4) may be a data structure that includes information regarding the relative value of an associated algorithmically derived data generator (212.2). The rankings may define a relative and/or absolute ordering of the algorithmically derive data generators with respect to the value of each respective algorithmically derive data generator.

The rankings (212.4) may be based on, for example, the relative value of derived data produced by deployed instances of the respective algorithmically derived data generators. For example, the rankings may be based on the utilization rate of the derived data in a global data aggregator. The rankings may be based on other factors without departing from the invention. For example, the rankings may be based on an amount of value one or more entities are willing to provide in exchange for being allowed to access derived data.

In one or more embodiments of the inventions, the rankings (212.4) indicate a relative level of confidence with respect to each of the rankings. For example, new types of algorithmically derived data generators may not have ever been utilized by any entity. Consequently, the value of derived data produced by the new types of algorithmically derived data generators or other metrics upon which a ranking may be generated may be unavailable. In such a scenario, the new types of algorithmically derived data generators may be given a provisional ranking, as indicated by a corresponding ranking (212.4), that indicates that there is a low amount of confidence in the ranking. Derived data generated by new types of algorithmically derived data generators may be marked (e.g., including information in metadata associated with the derived data indicating a low level of confidence) to notify downstream consumers of such data that it may be less reliable than other derived data not so marked.

While the data structures of FIGS. 2.1-2.2 have been illustrated as including a limited amount of specific information, the aforementioned data structures may include additional, different, and/or less information without departing from the invention. Additionally, the aforementioned data structures may be broken down into any number of data structures, be combined with other data structures that include different types information, have different structures than that illustrated in FIGS. 2.1-2.2, and/or may be spanned across any number of persistent storages without departing from the invention.

Returning to FIG. 1.1, the global data aggregator (108) may provide different types of services to manage data and/or the data aggregation deployments (100). FIGS. 3.1-5 show diagrams of methods that may be performed when the global data aggregator (108) when managing data and/or data aggregation deployments (100).

FIG. 3.1 shows a flowchart of a method in accordance with one or more embodiments of the invention. The method depicted in FIG. 3.1 may be used to manage data in accordance with one or more embodiments of the invention. The method shown in FIG. 3.1 may be performed by, for example, a global data aggregator (e.g., 108, FIG. 1.1). Other components of the system illustrated in FIG. 1.1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, deployment aggregated data is obtained from a deployment.

In one or more embodiments of the invention, the deployment aggregated data is obtained by receiving the data from the deployment. The deployment aggregated data may be obtained via other methods without departing from the invention. The deployment aggregated data may include data, derived data, and/or metadata.

In step 302, it is determined whether a new type of data is included in the deployment aggregated data.

In one or more embodiments of the invention, the determination is made by comparing the data, derived data, and/or metadata regarding the data and/or the derived data included in the deployment aggregated data to similar data included in globally aggregated data. For example, the deployment aggregated data may include a new type of data that is not included in the globally aggregated data. Such a scenario may occur when, for example, a new data provider is added to a deployment.

The determination may be made by, for example, determining that the metadata of the deployment aggregated data indicates that a portion of data of the deployment aggregated data is of a different type than has been previously received from the deployment.

The determination may be made by, for example, determining that the metadata of the deployment aggregated data indicates that a portion of the derived data of the deployment aggregated data is of a different type than has been previously received from the deployment.

While the determination has been described as being made based on comparisons of metadata included in the deployment aggregated data to metadata included in globally aggregated data, the determination may be made via other methods without departing from the invention. For example, one or more characteristics of the data and/or derived data of the deployment aggregated data may be compared to data and/or derived data included in globally aggregated data. If the characteristics of the data and/or derived data are not found to match those of data and/or derived data included in globally aggregated data, the determination may be made that a new type of data is included in the deployment aggregated data.

If it is determined that a new type of data is included in the deployment aggregated data, the method may proceed to step 304. If it is determined that no new types of data included in the deployment aggregated data, the method may proceed to step 306.

In step 304, an action set based on the new type of data is performed.

In one or more embodiments of the invention, the action set includes any number of actions to be performed. Performing the actions of the action set may cause the operation of the deployment from which the deployment aggregated data was obtained to be modified. For example, new algorithmically derived data generators may be deployed as part of the action set. In another example, new algorithmically derived data generators may be developed and/or deployed as part of the action set. The action set may include performing additional, different, and/or fewer actions without departing from the invention.

In one or more embodiments of the invention, the action set is performed based on the new type of the data via the method illustrated in FIG. 3.2. The action set may be performed via other methods without departing from the invention.

In step 306, globally aggregated data is updated based on the deployment aggregated data.

In one or more embodiments of the invention, the globally aggregated data is updated by adding all, or a portion, of the deployment aggregated data to the globally aggregated data.

In one or more embodiments of the invention, the globally aggregated data is updated by modifying all, or a portion, of the globally aggregated data based on all, or a portion of the deployment aggregated data.

In one or more embodiments of the invention, the globally aggregated data is updated by removing all, or a portion, of the globally aggregated data based on all, or a portion of the deployment aggregated data.

The method may end following step 306.

Thus, via the method illustrated in FIG. 3.1, a system in accordance with one or more embodiments of the invention may automatically take action in response to changes in the contents of deployment aggregated data over time. By doing so, embodiments of the invention may provide a method and/or system capable of enhancing the value of data generated by deployments without intervention by a user.

Consequently, the cognitive burden on administrators (e.g., managers) of deployments may be reduced while improving the likelihood of deployments generating valuable data.

FIG. 3.2 shows a flowchart of a method in accordance with one or more embodiments of the invention. The method depicted in FIG. 3.2 may be used to perform an action set in accordance with one or more embodiments of the invention. The method shown in FIG. 3.2 may be performed by, for example, a global data aggregator (e.g., 108, FIG. 1.1). Other components of the system illustrated in FIG. 1.1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, metadata associated with the new data is identified. The metadata associated with the new data may define one or more characteristics of the new data. For example, the metadata may specify the type of the new data, quantity of the new data, an identity of a data provider that generated all, or a portion, of the data, an algorithmically derived data generator that generated all, or a portion, of the new data, and/or other types of characteristics of the new data.

In step 312, it is determined whether the metadata is associated with an algorithmically derived data generator.

In one or more embodiments of the invention, the determination is made using an algorithm repository that associates different types of algorithmically derived data generators with different types of metadata. The determination may be made by attempting to match the metadata to similar metadata included in the algorithm repository. If a match is made, the determination may be made that the metadata is associated with an algorithmically derived data generator. If a match is not made, the determination may be made that the metadata is not associated with an algorithmically derived data generator.

If it is determined that the metadata is associated with an algorithmically derived data generator, the method may proceed to step 314. If it is determined that the metadata is not associated with an algorithmically derived data generator, the method may proceed to step 316.

In step 314, an algorithmically derived data generator is deployed to the deployment from which the new data was obtained.

In one or more embodiments of the invention, the algorithmically derived data generator is deployed to the deployment by instantiating a new instance of the algorithmically derived data generator in the deployment. The new instance of the algorithmically derived data generator may be configured to operate on similar new data obtained in the future. By operating on the similar new data obtained in the future, algorithmically derived data corresponding to the similar new data may be generated. Consequently, once the new instance of the algorithmically derived data generator is deployed, the deployment hosting the new instance may begin generating the algorithmically derived data.

In one or more embodiments of the invention, multiple algorithmically derived data generators may be deployed. For example, in step 312, the metadata may be associated with multiple algorithmically derived data generators. In such a scenario, instances of each of the multiple algorithmically derived data generators may be deployed.

In one or more embodiments of the invention, instances of a portion of the multiple algorithmically derived data generators are deployed. For example, only those algorithmically derived data generators meeting a minimum, predetermined ranking may be deployed. The predetermined minimum ranking may be dynamic based on the available computational resources of a deployment. For example, the larger the amount of free computational resources, the lower the predetermined ranking may be set. As the available computational resources of the deployment change, the predetermined ranking may change corresponding to the resource availability.

The method may end following step 314.

Returning to step 312, the method may proceed to step 316 following step 312 if the metadata is not associated with any algorithmically derived data generators.

In step 316, a new algorithmically derived data generator is generated based on the new data. For example, a new algorithmically derived data generator may be generated based on an existing algorithmically derived data generator that is associated with a similar type of the new data.

In one or more embodiments of the invention, the new algorithmically derived data generator is generated by assigning a data scientist to generate the new algorithmically derived data generator. Once generated, the new algorithmically derived data generator may be added to the algorithm repository.

In one or more embodiments of the invention, the new algorithmically derived data generator may be marked as experimental to indicate that the derived data that may be generated by the new algorithmically derived data generator may not be trustworthy. For example, the rankings for the new algorithmically derived data generator may reflect the experimental status of the new algorithmically derived data generator. The rankings may be updated to remove the experimental status of the new algorithmically derived data generator after the derived data generated by the new algorithmically derived data generator is verified.

In one or more embodiments of the invention, the data generated by the new algorithmically derived data generator is verified based on utilization of the derived data from one or more entities. For example, after other entities began utilizing the derived data, other entities may provide feedback with respect to the relative value of the derived data based on their utilization of the derived data. If the derived data is not utilized, the experimental status of the new algorithmically derived data generator may be maintained. Such information may be used by data scientists or components of the system of FIG. 1.1 to ascertain whether additional new algorithm the drive to data generators should be generated. For example, a low utilization rate of the new derived data may indicate that the derived data is of little value due to a poor algorithm for generating the data being employed by the new algorithmically derived data generator.

In step 318, the new algorithmically derived data generator is deployed as an experimental generator to the deployment. The new algorithmically derived data generator may be deployed as the experimental generator to the deployment similar to that described with respect to step 314. However, the experimental generator to be configured to mark or otherwise indicate the metadata that derived data generated by the experimental generator may not be trustworthy. Consequently, such information may be incorporated into globally aggregated data maintained by a global data aggregator. Accordingly, downstream entities and may utilize the derived data may be made aware of the low trustworthiness of the derived data.

The method may end following step 318.

Thus, via the method illustrated in FIG. 3.2, a system in accordance with one or more embodiments of the invention may automatically modify deployments to begin generating new derived data when performing an action set. By doing so, embodiments of the invention may provide a method and/or system capable of automatically causing deployments to begin generating additional types of data when an action set is performed. Consequently, the cognitive burden on administrators (e.g., managers) of deployments may be reduced while improving the likelihood of deployments generating valuable data.

As discussed above, the global data aggregator of FIG. 1.1 may modify the operation of any number of deployments when providing data and/or operation management services. The global data aggregator may do so based on its visibility into the operations of multiple deployments based on deployment aggregated data obtained from the deployments. Due to this visibility, the global data aggregator may facilitate the modification of the functionality of a first deployment based on information obtained from a second deployment. FIG. 4 illustrates a method that may be performed by a global data aggregator when facilitating such modifications.

FIG. 4 shows a flowchart of a method in accordance with one or more embodiments of the invention. The method depicted in FIG. 4 may be used to modify the functionality of a deployment in accordance with one or more embodiments of the invention. The method shown in FIG. 4 may be performed by, for example, a global data aggregator (e.g., 108, FIG. 1.1). Other components of the system illustrated in FIG. 1.1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, deployment of an algorithmically derived data generator to a first deployment is identified. The algorithmically derived data generator may be associated with metadata (e.g., information specifying a type or other characteristics of data upon which the algorithmically derive data generator may operate).

In one or more embodiments of the invention, the deployment of the algorithmically derived data generator is performed by a global data aggregator that performs identification. In one or more embodiments of the invention, the deployment of the algorithmically derived data generator is identified based on the message received from a deployment to which the algorithmically derived data generator was deployed. For example, deployments may notify the global data aggregator response to deployments of algorithmically derived data generators. The aforementioned process may be a part of the registration process for the algorithmically derived data generators with the deployment and/or the global data aggregator.

In step 402, it is determined whether a second deployment is providing additional metadata that is similar to the metadata associated with the algorithmically derived data generator. For example, the determination may be made by searching the metadata provided by the second deployment as part of providing deployment aggregated data for similar metadata.

If the search determines that the second deployment is providing additional metadata that is similar to the metadata associated with the algorithmically derived data generator, the method may proceed to step 404. If it is determined that the second deployment is not providing additional metadata that is similar to the metadata associated with algorithmically derived data generator, the method may end following step 402.

If the second deployment is providing the additional metadata, that may indicate that the second deployment may be generating data upon which the deployed algorithmically derived data generator may operate to generate derived data.

In step 404, it is determined whether the second deployment is generating algorithmically derived data associated with the additional metadata. In other words, it is determined whether the second deployment is already generating derived data corresponding to derived data that may be generated by an additional instance of the algorithmically derived data generator operating on data obtained from the second deployment. The association may be that, for example, the second deployment is obtaining data associated with the metadata that may be operated on by a new instance of the algorithmically derived data generator.

If it is determined that the second deployment is not generating the algorithmically derived data associated with the additional metadata, the method may proceed to step 406. If it is determined that the second deployment is generating the algorithmically derived data associated with the additional metadata, the method may end following step 404.

In step 406, an instance of the algorithmically derived data generator is deployed to the second deployment. Deploying the instance of the algorithmically derived data generator to the second deployment may be performed similarly to that described with respect to step 314 of FIG. 3.2. However, the deployed instance of the algorithmically derived data generator may operate on data obtained by the second deployment and associated with the additional metadata.

Deployment of the instance of the algorithmically derived data generator to the second deployment may cause the second deployment to generate algorithmically derived data associated with the additional metadata. In other words, generate algorithmically derived data based on obtained data that is associated with additional metadata.

The method may end following step 406.

Thus, via the method illustrated in FIG. 4, a system in accordance with one or more embodiments of the invention may automatically modify the functionality of deployments based on information obtained from other deployments. By doing so, embodiments of the invention may provide a method and/or system capable of automatically causing deployments to begin generating additional types of data when a commonality between the deployments is identified. Consequently, the cognitive burden on administrators (e.g., managers) of deployments may be reduced while improving the likelihood of deployments generating valuable data.

Figure 5:
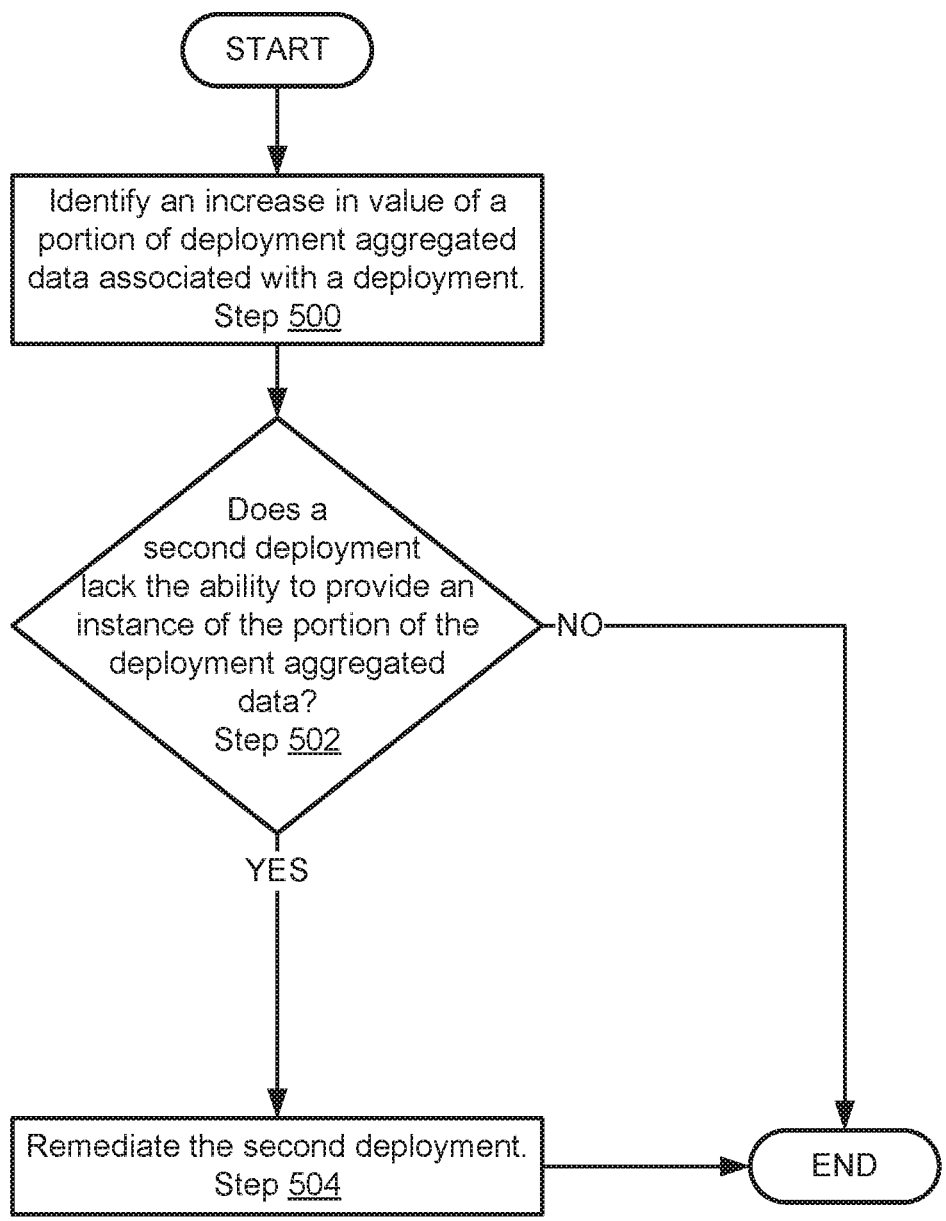
FIG. 5 shows a flowchart of a method of remediating a deployment in accordance with one or more embodiments of the invention.

FIG. 5 shows a flowchart of a method in accordance with one or more embodiments of the invention. The method depicted in FIG. 5 may be used to update deployments in accordance with one or more embodiments of the invention. The method shown in FIG. 5 may be performed by, for example, a global data aggregator (e.g., 108, FIG. 1.1). Other components of the system illustrated in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, an increase in value of a portion of deployment aggregated data associated with a deployment is identified.

In one or more embodiments of the invention, increase in value of the portion of the deployment aggregated data is identified by monitoring utilization rates of data obtained from the deployment. For example, the value of the portion of the deployment aggregated data increase when more highly utilized by any number of entities.

In one or more embodiments of the invention, utilization rate of the portion of the deployment aggregated data is identified by monitoring accessing of the data by any number of entities.

In one or more embodiments of the invention, the increase in value of the portion of the deployment aggregated data is identified based on the change in the consideration any number of entities are willing to provide to have access to the portion of the deployment aggregated data. For example, a global data aggregator may facilitate access to data by restricting access absent consideration being provided. The consideration may be any type of resources (e.g., financial, computational, organizational, etc.).

In step 502, it is determined whether a second deployment lacks the ability to provide an instance of the portion of the deployment aggregated data. The instance of the portion of the deployment aggregated data may be, for example, data obtained from a data provider of the second deployment having similar characteristics to that of a data provider of the deployment that provided the portion of the deployment aggregated data.

In one or more embodiments of the invention, the portion of the deployment aggregated data is data provided by a data provider. The data provider may be, for example, a sensor. The instance of the portion of the deployment aggregated data may be, for example, data provided by a similar sensor included in the second deployment.

To make the determination, a global data aggregator may compare the portion of the deployment aggregated data to similar deployment aggregated data obtained from the second deployment. If the comparison indicates that a match between the portion of the deployment aggregated data and a portion of the deployment aggregated data obtained from the second deployment is not found, the determination may be that the second deployment lacks the ability. Conversely, if the comparison indicates that a match between the portion of the deployment aggregated data and a portion of the deployment aggregated data obtained from the second deployment is found, the determination may be that the second deployment includes the ability.

If it is determined that the second deployment lacks the ability to provide an instance of the portion of the deployment aggregated data, the method may proceed to step 504. If it is determined that the second deployment includes the ability to provide the instance of the portion of the deployment aggregated data, the method may end following step 502.

In step 504, the second deployment is remediated.

In one or more embodiments of the invention, remediating the second deployment includes sending a deployment update to the second deployment. The deployment update may specify one or more modifications that may be made to the second deployment to enable the second deployment to provide instance of the portion of the deployment aggregated data. For example, the deployment update may specify that the addition of a type of data provider the second deployment may enable the second deployment to provide instance of the portion of the deployment aggregated data.

The second deployment (or administrators of the second deployment) may take action in response to the deployment update. Specifically, the second deployment may modify the second deployment to conform to the deployment update. By doing so, the second deployment may be remediated to enable it to provide one or more instances of the portion of the deployment aggregated data.

The method may end following Step 504.

Thus, via the method illustrated in FIG. 5, a system in accordance with one or more embodiments of the invention may automatically remediate deployments that lack similar data generating capabilities when it is determined that the data generation capability may be valuable. By doing so, embodiments of the invention may provide a method and/or system capable of automatically causing deployments to be updated to provide more valuable data. Consequently, the cognitive burden on administrators (e.g., managers) of deployments may be reduced while improving the likelihood of deployments generating valuable data.

To further clarify embodiments of the invention, a non-limiting example is provided in FIGS. 6.1-6.5. FIGS. 6.1-6.5 may illustrate a diagram of a system similar to that of FIG. 1.1 over a period of time. For the sake of brevity, only a limited number of components of the system of FIG. 1.1 are illustrated in each of FIGS. 6.1-6.5.

Example

Consider a scenario as illustrated in FIG. 6.1 in which a global data aggregator (108) is providing data and/or operational management services to the first data aggregation deployment (102) and the second data aggregation deployment (104). The first data aggregation deployment (102) may be integrated into a first factory setting in which a product is being produced. As part of producing the product, information regarding the production process may be obtained by the global data aggregator (108).

To obtain information regarding the production process, the first data aggregation deployment (102) may include a data aggregator (102.2). The data aggregator (102.2) may aggregate data obtained from a temperature sensor (600). The temperature sensor (600) may monitor the temperature of products as the products are produced. Such information may be used by entities to interpret the relative quality of the products as the products are produced.

The second data aggregation deployment (104) may be integrated into a second factory setting in which similar products, to that produced by the first factory setting, are produced. Like the first factory setting, it may be valuable to obtain information regarding the production process of the products. To do so, the global data aggregator (108) may obtain such information from the second data aggregation deployment (104).

To obtain information regarding the production process of the products produced in the second factory setting, the second data aggregation deployment (104) may include a data aggregator (104.2). The second data aggregator (104.2) may aggregate data obtained from a second temperature sensor (602). The second temperature sensor (602) may monitor the temperature of products as the products are produced by the second factory setting. Like the similar data obtained from the first data aggregation deployment (102), the data obtained from the second temperature sensor (602) may be used by entities to interpret the relative quality of the products produced by the second factory setting.

At a first point in time as illustrated in FIG. 6.2, the manager (not shown) of the first factory setting may add a count sensor (604) to the first data aggregation deployment (102). The manager of the first factory setting may do so to obtain a more accurate picture of the production environment in terms of the quantity of the products being produced as well as the quality.

After the count sensor (604) is added to the first factory setting, the data aggregator (102.2) of the first data aggregation deployment (102) begins obtaining data from both of the sensors (e.g., 600, 604). After obtaining the data, the data aggregator (102.2) provides the data to the global data aggregator (108).

When the global data aggregator (108) obtains the data from the data aggregator (102.2), the global data aggregator (108) identifies that a new type of data is included in the data obtained from the data aggregator (102.2). In response to the determination, the global data aggregator (108) compares metadata associated with the new type of data included in the data to information included in an algorithm repository. Based on the comparison, the global data aggregator (108) determines that a part quality algorithmically derived data generator should be deployed to the first factory setting. The determination may be made based on a match identified based on the comparison of the metadata.

In response to the determination, the global data aggregator (108) deploys a part quality algorithmically derived data generator (606) to the first data aggregation deployment (102) as illustrated in FIG. 6.3. The part quality algorithmically derived data generator (606) is programmed to operate on data obtained from a count sensor (604). The aforementioned data generator may have been developed for other deployments not illustrated here.

Once deployed, the part quality algorithmically derived data generator (606) begins generating derived data based on the data obtained from the count sensor (604). Consequently, when the data aggregator (102.2) provides data to the global data aggregator (108) in the future, the data aggregator (102.2) will also provide derived data in addition to the data obtained from the sensors. By doing so, entities that utilize data managed by the global data aggregator (108) may have access to more valuable data.

At a second point in time, the global data aggregator (108) determines that the second factory setting could benefit from inclusion of a count sensor into the environment. The global data aggregator (108) makes the determination by identifying that the second data aggregation deployment (104) is incapable of providing such data to the global data aggregator (108). In response to the determination, the global data aggregator (108) sends a deployment update (610) as illustrated in FIG. 6.4 to the second data aggregation deployment (104).

The deployment update (610) indicates that a count sensor similar to that incorporated into the first factory setting should be incorporated into the second factory setting. In response to obtaining the deployment update (610), managers (not illustrated) of the second factory setting integrate in the count sensor (608) to the second factory setting as illustrated in FIG. 6.5.

Once integrated into the second factory setting, the data aggregator (104.2) begins providing data from the second temperature sensor (602) and the count sensor (608) to the global data aggregator (108). In response to obtaining the data from the count sensor (608) via the data aggregator (104.2), the global data aggregator (108) determines that data obtained from the second factory setting could be improved by adding an additional instance of the part quality algorithmically derived data generator to the data aggregator (104.2) of the second data aggregation deployment (104), like the determination made with respect to the first data aggregation deployment (102).

In response to the determination, the global data aggregator (108) instantiates another instance of the part quality algorithmically derived data generator (612) in the data aggregator (104.2). Consequently, in the state illustrated in FIG. 6.5, both of the data aggregation deployments (102, 104) provide derived data in the form of part quality data, in addition to the data provided by the respective sensors (e.g., 600, 602, 604, 608).

End of Example

Figure 7:
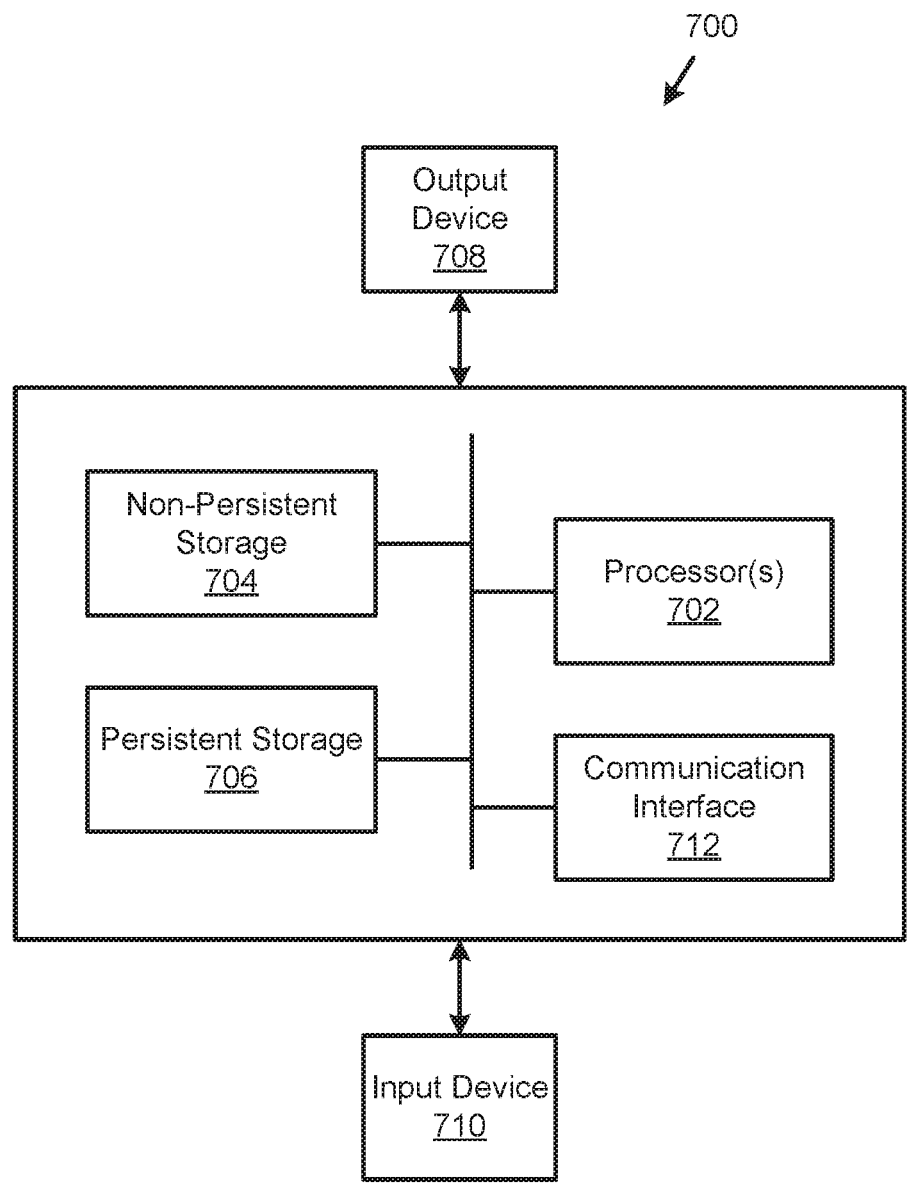
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), Output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide methods, devices, and/or systems for managing data in an environment where large amount of data are obtained and/or the types of obtained data may be changing dynamically. Specifically, embodiments of the invention may provide a method for automatically modifying the operation of one or more deployments in response to changes in data Obtained from the deployments. By doing so, embodiments of the invention may automatically cause the deployments to generate more valuable data without user intervention. By doing so, embodiments of the invention may provide a method for reducing the cognitive burden on a user.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device for managing deployments, comprising:
   persistent storage for storing:
      globally aggregated data associated with a first data provider, and
      an algorithm repository; and
   a processor that:
      obtains deployment aggregated data from a deployment of the deployments;
      makes a determination that the deployment aggregated data comprises a new type of data associated with a second data provider different from the first data provider and that the new type of data in the deployment aggregated data that is associated with the second data provider is incompatible with existing data included in the globally aggregated data that is associated with the first data provider; and
      in response to the determination:
         performs an action set, based on the new type of data and without user intervention, to modify a content of future deployment data obtained from the deployment to reflect one or more changes associated with the new type of data to remedy the incompatibility between the new type of data of the deployment aggregated data and the existing data included in the globally aggregated data.

2. The computing device of claim 1, wherein performing the action set to modify the content of the future deployment aggregated data obtained from the deployment comprises:
   identifying metadata associated with the new type of data;
   making a second determination that the metadata is associated with an algorithmically derived data generator stored in the algorithm repository; and
   deploying the algorithmically derived data generator to the deployment based on the second determination.

3. The computing device of claim 2, wherein deploying the algorithmically derived data generator to the deployment comprises:
   instantiating a new instance of the algorithmically derived data generator from the deployment,
   wherein the new instance of the algorithmically derived data generator is adapted to generate algorithmically derived data using an instance of the new type of data stored in the deployment.

4. The computing device of claim 1, wherein performing the action set to modify the content of the future deployment aggregated data obtained from the deployment comprises:
   identifying metadata associated with the new type of data;
   making a second determination that the metadata is not associated with any algorithmically derived data generator stored in the algorithm repository;
   generating a new algorithmically derived data generator based on the new type of data; and
   deploying the new algorithmically derived data generated as an experimental generator.

5. The computing device of claim 4, wherein the algorithmically derived data generated by the experimental generator is flagged by the computing device as untrustworthy.

6. The computing device of claim 1, wherein the computing device is further programmed to:
   identify, a deployment of algorithmically derived data generated from a second deployment that is associated with metadata;
   make a second determination that the second deployment is providing additional metadata that is similar to the metadata; and
   in response to the second determination:
      make a third determination that the second deployment is not generating algorithmically derived data associated with the additional metadata; and
      deploy an instance of the algorithmically derived data generator to the second deployment.

7. The computing device of claim 6, wherein deploying the instance of the algorithmically derived data generator to the second deployment causes the second deployment to generate algorithmically derived data associated with the additional metadata.

8. A method of managing deployments by a computing device for managing deployments, comprising:
   obtaining deployment aggregated data from a deployment of the deployments;
   making a determination that the deployment aggregated data comprises a new type of data associated with a first data provider different from a second data provider associated with globally aggregated data stored in the computing device and that the new type of data in the deployment aggregated data that is associated with the first data provider is incompatible with existing data included in the globally aggregated data that is associated with the second data provider; and
   in response to the determination:
      performing an action set, based on the new type of data and without user intervention, to modify a content of future deployment aggregated data obtained from the deployment to reflect one or more changes associated with the new type of data to remedy the incompatibility between the new type of data of the deployment aggregated data and the existing data included in the globally aggregated data.

9. The method of claim 8, wherein performing the action set to modify the content of the future deployment aggregated data obtained from the deployment comprises:
   identifying metadata associated with the new type of data;
   making a second determination that the metadata is associated with an algorithmically derived data generator stored in an algorithm repository; and
   deploying the algorithmically derived data generator to the deployment based on the second determination.

10. The method of claim 9, wherein deploying the algorithmically derived data generator to the deployment comprises:
   instantiating a new instance of the algorithmically derived data generator from the deployment, wherein the new instance of the algorithmically derived data generator is adapted to generate algorithmically derived data using an instance of the new type of data stored in the deployment.

11. The method of claim 8, wherein performing the action set to modify the content of the future deployment aggregated data obtained from the deployment comprises:
identifying metadata associated with the new type of data;
making a second determination that the metadata is not associated with any algorithmically derived data generator stored in an algorithm repository;
generating a new algorithmically derived data generator based on the new type of data; and
deploying the new algorithmically derived data generated as an experimental generator.

12. The method of claim 11, wherein the algorithmically derived data generated by the experimental generator is flagged as untrustworthy.

13. The method of claim 8, further comprising:
identifying a deployment of algorithmically derived data generated from a second deployment that is associated with metadata;
making a second determination that the second deployment is providing additional metadata that is similar to the metadata; and
in response to the second determination:
making a third determination that the second deployment is not generating algorithmically derived data associated with the additional metadata; and
deploying an instance of the algorithmically derived data generator to the second deployment.

14. The method of claim 13, wherein deploying the instance of the algorithmically derived data generator to the second deployment causes the second deployment to generate algorithmically derived data associated with the additional metadata.

15. A non-transitory computer readable medium of a computing device for managing deployments comprising computer readable program code, which when executed by a computer processor of the computing device enables the computer processor to perform a method for managing deployments, the method comprising:
obtaining deployment aggregated data from a deployment of the deployments;
making a determination that the deployment aggregated data comprises a new type of data associated with a first data provider different from a second data provider associated with globally aggregated data stored in the computing device and that the new type of data in the deployment aggregated data that is associated with the first data provider is incompatible with existing data included in the globally aggregated data that is associated with the second data provider; and
in response to the determination:
performing an action set, based on the new type of data and without user intervention, to modify a content of future deployment aggregated data obtained from the deployment to reflect one or more changes associated with the new type of data to remedy the incompatibility between the new type of data of the deployment aggregated data and the existing data included in the globally aggregated data.

16. The non-transitory computer readable medium of claim 15, wherein performing the action set to modify the content of the future deployment aggregated data obtained from the deployment comprises:
identifying metadata associated with the new type of data;
making a second determination that the metadata is associated with an algorithmically derived data generator stored in an algorithm repository; and
deploying the algorithmically derived data generator to the deployment based on the second determination.

17. The non-transitory computer readable medium of claim 16, wherein deploying the algorithmically derived data generator to the deployment comprises:
instantiating a new instance of the algorithmically derived data generator in the deployment,
wherein the new instance of the algorithmically derived data generator is adapted to generate algorithmically derived data using an instance of the new type of data stored in the deployment.

18. The non-transitory computer readable medium of claim 15, wherein performing the action set to modify the content of the future deployment aggregated data obtained from the deployment comprises:
identifying metadata associated with the new type of data;
making a second determination that the metadata is not associated with any algorithmically derived data generator stored in an algorithm repository;
generating a new algorithmically derived data generator based on the new type of data; and
deploying the new algorithmically derived data generated as an experimental generator.

19. The non-transitory computer readable medium of claim 18, wherein algorithmically derived data generated by the experimental generator is flagged as untrustworthy.

20. The non-transitory computer readable medium of claim 15, further comprising:
identifying a deployment of algorithmically derived data generated from a second deployment that is associated with metadata;
making a second determination that the second deployment is providing additional metadata that is similar to the metadata; and
in response to the second determination:
making a third determination that the second deployment is not generating algorithmically derived data associated with the additional metadata; and
deploying an instance of the algorithmically derived data generator to the second deployment.

* * * * *